(12) United States Patent
Masui

(10) Patent No.: US 11,093,192 B2
(45) Date of Patent: Aug. 17, 2021

(54) INFORMATION PROCESSING APPARATUS, SERVER APPARATUS, AND BUSINESS SYSTEM

(71) Applicant: FUJIFILM Business Innovation Corp., Tokyo (JP)

(72) Inventor: Takanori Masui, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 218 days.

(21) Appl. No.: 16/181,360

(22) Filed: Nov. 6, 2018

(65) Prior Publication Data

US 2019/0146738 A1 May 16, 2019

(30) Foreign Application Priority Data

Nov. 14, 2017 (JP) .............................. JP2017-219533

(51) Int. Cl.
*G06F 3/12* (2006.01)

(52) U.S. Cl.
CPC .......... *G06F 3/1273* (2013.01); *G06F 3/1204* (2013.01); *G06F 3/1225* (2013.01); *G06F 3/1288* (2013.01)

(58) Field of Classification Search
CPC .... G06F 3/1273; G06F 3/1204; G06F 3/1288; G06F 3/1225; G06F 3/123; G06F 3/1285; G06F 3/1203; G06Q 30/0631; G06Q 30/06; G06Q 10/0637; G06Q 10/0639
See application file for complete search history.

(56) References Cited

U.S. PATENT DOCUMENTS

| | | | |
|---|---|---|---|
| 8,099,384 B2 | 1/2012 | Miyazawa et al. | |
| 2013/0235428 A1* | 9/2013 | Ohta | H04N 1/0009 358/1.16 |
| 2014/0350990 A1* | 11/2014 | Zeng | G06Q 30/06 705/7.23 |
| 2015/0051930 A1* | 2/2015 | Yamaguchi | G06Q 10/0631 705/7.12 |
| 2015/0163121 A1* | 6/2015 | Mahaffey | H04W 12/12 707/687 |
| 2015/0178741 A1 | 6/2015 | Ono et al. | |

FOREIGN PATENT DOCUMENTS

| | | |
|---|---|---|
| JP | 2009224958 | 10/2009 |
| JP | 2015135663 | 7/2015 |

OTHER PUBLICATIONS

"Office Action of Japan Counterpart Application", dated Jun. 1, 2021, with English translation thereof, pp. 1-6.

* cited by examiner

*Primary Examiner* — Neil R McLean
(74) *Attorney, Agent, or Firm* — JCIPRNET

(57) ABSTRACT

An information processing apparatus includes a collection unit that collects at least any two selected from a job log, an image log of a document, and information to be monitored through communication with a terminal present around the information processing apparatus; a classification unit that classifies at least two of the job log, the image log, and the information to be monitored collected by the collection unit by type; and an aggregation unit that aggregates results of use for combinations in which at least two types of the job log, the image log, and the information to be monitored classified by the classification unit are combined.

19 Claims, 24 Drawing Sheets

FIG. 8

| BUSINESS ANALYSIS PLUG-IN | PLUG-IN Ver |
|---|---|
| WA_PLUGIN-01 | V1.0.0 |
| WA_PLUGIN-02 | V1.0.2 |
| WA_PLUGIN-03 | V1.0.0 |

FIG. 9

| FUNCTION PROVIDING PLUG-IN | PLUG-IN Ver |
|---|---|
| FO_PLUGIN-01 | V1.0.0 |
| FO_PLUGIN-02 | V1.0.0 |
| FO_PLUGIN-03 | V1.0.0 |

FIG. 12

| CUSTOMER ID | BUSINESS TYPE | BUSINESS SCALE |
|---|---|---|
| CUSTOMER01 | MANUFACTURING INDUSTRY | MEDIUM (20 PEOPLE TO 300 PEOPLE) |
| CUSTOMER02 | SERVICE INDUSTRY | SMALL (TO FIVE PEOPLE) |

FIG. 13

| CUSTOMER ID | APPARATUS ID |
|---|---|
| CUSTOMER01 | MFP001 |
| CUSTOMER02 | MFP002 |
| CUSTOMER02 | MFP004 |

FIG. 14

| BUSINESS TYPE | BUSINESS SCALE | BUSINESS ANALYSIS PLUG-IN | PLUG-IN Ver |
|---|---|---|---|
| MANUFACTURING INDUSTRY | LARGE (300 PEOPLE TO) | WA_PLUGIN-01 | V1.0.0 |
| MANUFACTURING INDUSTRY | MEDIUM AND SMALL (20 PEOPLE TO 300 PEOPLE) | WA_PLUGIN-02 | V1.0.2 |
| MANUFACTURING INDUSTRY | SMALL (TO 20 PEOPLE) | WA_PLUGIN-03 | V1.0.0 |
| SERVICE INDUSTRY | LARGE (100 PEOPLE TO) | WA_PLUGIN-04 | V1.0.0 |
| SERVICE INDUSTRY | MEDIUM AND SMALL (5 PEOPLE TO 100 PEOPLE) | WA_PLUGIN-05 | V1.0.0 |
| SERVICE INDUSTRY | SMALL (5 PEOPLE OR LESS) | WA_PLUGIN-06 | V1.0.1 |

FIG. 18

| JOB TYPE | DOCUMENT TYPE | NUMBER OF PAGES |
|---|---|---|
| MOBILE JOB | INVOICE | 0 |
| | REPORT (TO BE SHARED) | 50 |
| | REPORT | 200 |
| FAX JOB | INVOICE | 0 |
| | REPORT (TO BE SHARED) | 150 |
| | REPORT | 15 |
| GENERAL JOB | INVOICE | 450 |
| | REPORT (TO BE SHARED) | 200 |
| | REPORT | 150 |

| USER ID | FIRST RECEPTION TIME | LAST RECEPTION TIME |
|---|---|---|
| USER001 | 06:30 | 17:00 |
| USER002 | 07:13 | 17:28 |
| USER003 | 08:00 | 16:30 |

| ANALYSIS RESULT | NUMBER OF CORRESPONDING PEOPLE | EXTENDED TIME |
|---|---|---|
| EARLY MORNING WORK | 1 | 20 |
| LATE NIGHT WORK | 4 | 140 |
| HOLIDAY WORK | 2 | 32 |

| THERMOMETER ID | TIME | TEMPERATURE |
|---|---|---|
| THERMOMETER 01 | 08:00 | 22.0 DEGREE |
| THERMOMETER 01 | 10:00 | 22.4 DEGREE |
| THERMOMETER 01 | 12:00 | 24.0 DEGREE |

| ANALYSIS RESULT | NUMBER OF DAYS | TIME |
|---|---|---|
| EXCEED COMFORT TEMPERATURE UPPER LIMIT | 2 | 18 HOURS |
| EXCEED COMFORT TEMPERATURE LOWER LIMIT | 4 | 14 HOURS |

FIG. 22

BUSINESS SCALE = LARGE

| JOB TYPE | DOCUMENT TYPE | CONDITION | RECOMMENDING FUNCTION PROVIDING PLUG-IN | RECOMMENDED PRODUCT |
|---|---|---|---|---|
| MOBILE JOB | INVOICE | 50 PAGES OR MORE | e-DOCUMENT STORAGE SERVICE LINK PLUG-IN | e-DOCUMENT STORAGE SERVICE |
| | REPORT (TO BE SHARED) | 30 PAGES OR MORE | DOCUMENT SHARING SERVICE LINK PLUG-IN | DOCUMENT SHARING SERVICE |
| | REPORT | 30 PAGES OR MORE | DOCUMENT SHARING SERVICE LINK PLUG-IN | DOCUMENT SHARING SERVICE |
| FAX JOB | INVOICE | 50 PAGES OR MORE | ELECTRONIC CERTIFICATE EXCHANGE SERVICE LINK PLUG-IN | ELECTRONIC CERTIFICATE EXCHANGE SERVICE |
| | REPORT (TO BE SHARED) | 50 PAGES OR MORE | PAPERLESS FAX SERVICE LINK PLUG-IN | PAPERLESS FAX SERVICE |
| | REPORT | 50 PAGES OR MORE | DOCUMENT SHARING SERVICE LINK PLUG-IN | DOCUMENT SHARING SERVICE |
| GENERAL JOB | INVOICE | 100 PAGES OR MORE (NUMBER OF PAGES IN MOBILE JOB = 0) | e-DOCUMENT STORAGE SERVER LINK PLUG-IN | e-DOCUMENT STORAGE SERVER SW (ON-PREMISE) |
| | REPORT (TO BE SHARED) | 100 PAGES OR MORE (NUMBER OF PAGES IN MOBILE JOB = 0) | DOCUMENT SHARING SERVER LINK PLUG-IN | DOCUMENT SHARING SERVER SW (ON-PREMISE) |
| | REPORT | 100 PAGES OR MORE (NUMBER OF PAGES IN MOBILE JOB = 0) | DOCUMENT SHARING SERVER LINK PLUG-IN | DOCUMENT SHARING SERVER SW (ON-PREMISE) |

FIG. 23

BUSINESS SCALE = SMALL

| JOB TYPE | DOCUMENT TYPE | CONDITION | BUSINESS FUNCTION PROVIDING PLUG-IN | RECOMMENDED PRODUCT |
|---|---|---|---|---|
| MOBILE JOB | INVOICE | 50 PAGES OR MORE | e-DOCUMENT STORAGE SERVICE LINK PLUG-IN | e-DOCUMENT STORAGE SERVICE |
| | REPORT (TO BE SHARED) | 30 PAGES OR MORE | DOCUMENT SHARING SERVICE LINK PLUG-IN | DOCUMENT SHARING SERVICE |
| | REPORT | 30 PAGES OR MORE | DOCUMENT SHARING SERVICE LINK PLUG-IN | DOCUMENT SHARING SERVICE |
| FAX JOB | INVOICE | 50 PAGES OR MORE | ELECTRONIC CERTIFICATE EXCHANGE SERVICE LINK PLUG-IN | ELECTRONIC CERTIFICATE EXCHANGE SERVICE |
| | REPORT (TO BE SHARED) | 50 PAGES OR MORE | PAPERLESS FAX SERVICE LINK PLUG-IN | PAPERLESS FAX SERVICE |
| | REPORT | 50 PAGES OR MORE | DOCUMENT SHARING SERVICE LINK PLUG-IN | DOCUMENT SHARING SERVICE |
| GENERAL JOB | INVOICE | 100 PAGES OR MORE | e-DOCUMENT STORAGE SERVICE LINK PLUG-IN | e-DOCUMENT STORAGE SERVICE |
| | REPORT (TO BE SHARED) | 100 PAGES OR MORE | DOCUMENT SHARING SERVER LINK PLUG-IN | DOCUMENT SHARING SERVICE |
| | REPORT | 100 PAGES OR MORE | DOCUMENT SHARING SERVER LINK PLUG-IN | DOCUMENT SHARING SERVICE |

FIG. 24

BUSINESS SCALE = LARGE/SMALL

| IoT INFORMATION | | INFORMATION TYPE | CONDITION | RECOMMENDING FUNCTION PROVIDING PLUG-IN | RECOMMENDED PRODUCT |
|---|---|---|---|---|---|
| ARRIVE AND LEAVE | | EARLY MORNING WORK + LATE NIGHT WORK | NUMBER OF DAYS IS 10 DAYS OR MORE OR EXTENDED TIME IS 50 HOURS OR MORE | TIME ATTENDANCE MANAGEMENT PLUG-IN A | TIME ATTENDANCE MANAGEMENT CLOUD SERVICE |
| | | HOLIDAY WORK | NUMBER OF DAYS IS 2 DAYS OR MORE OR EXTENDED TIME IS 10 HOURS OR MORE | TIME ATTENDANCE MANAGEMENT PLUG-IN B | TIME ATTENDANCE MANAGEMENT CLOUD SERVICE SECURITY GUARANTEE SERVICE |
| TEMPERATURE | | EXCEED COMFORT TEMPERATURE UPPER LIMIT | NUMBER OF DAYS IS 5 DAYS OR MORE OR EXTENDED TIME IS 20 HOURS OR MORE | AIR CONDITIONING MANAGEMENT PLUG-IN A | AIR CONDITIONING MANAGEMENT SERVICE |

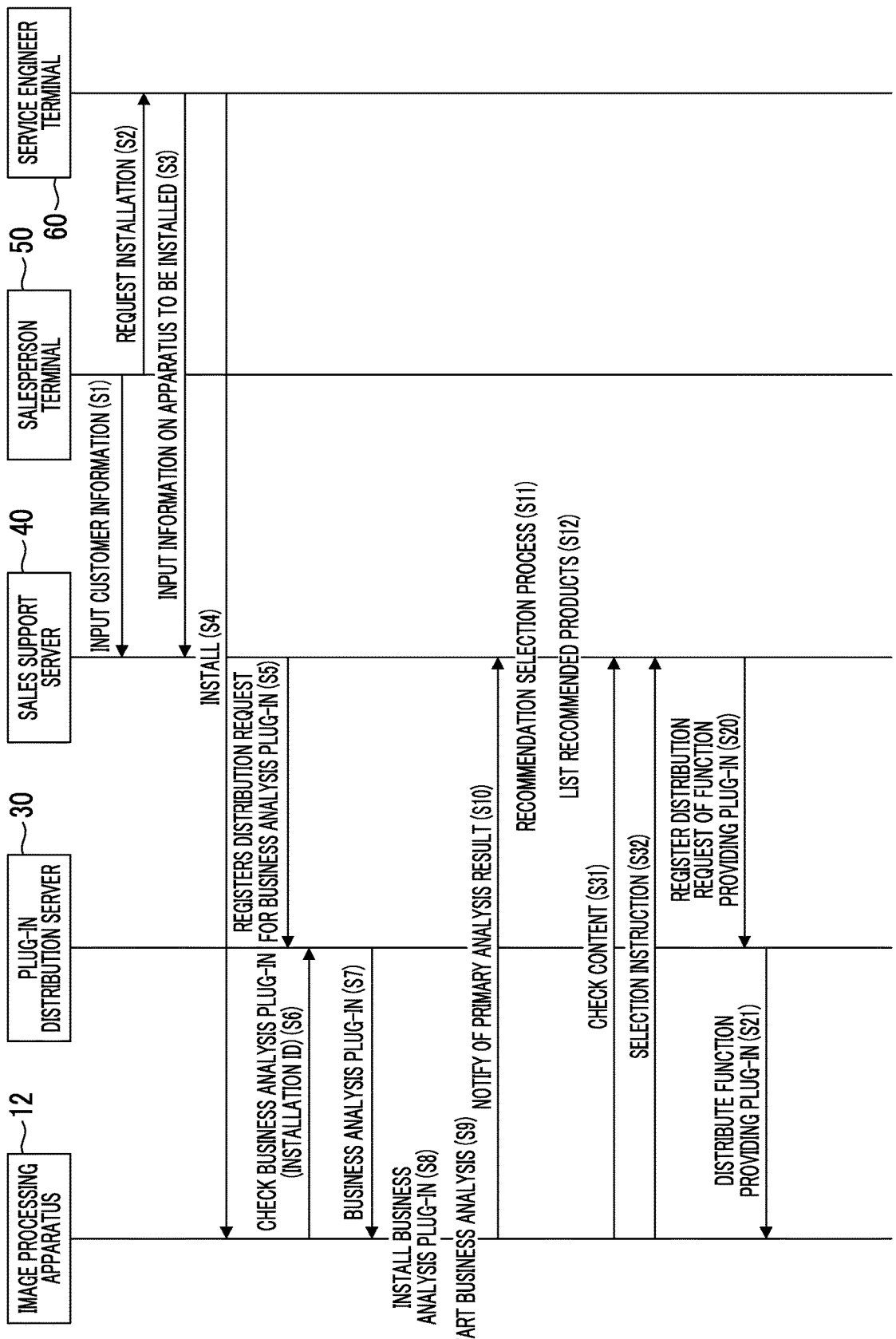

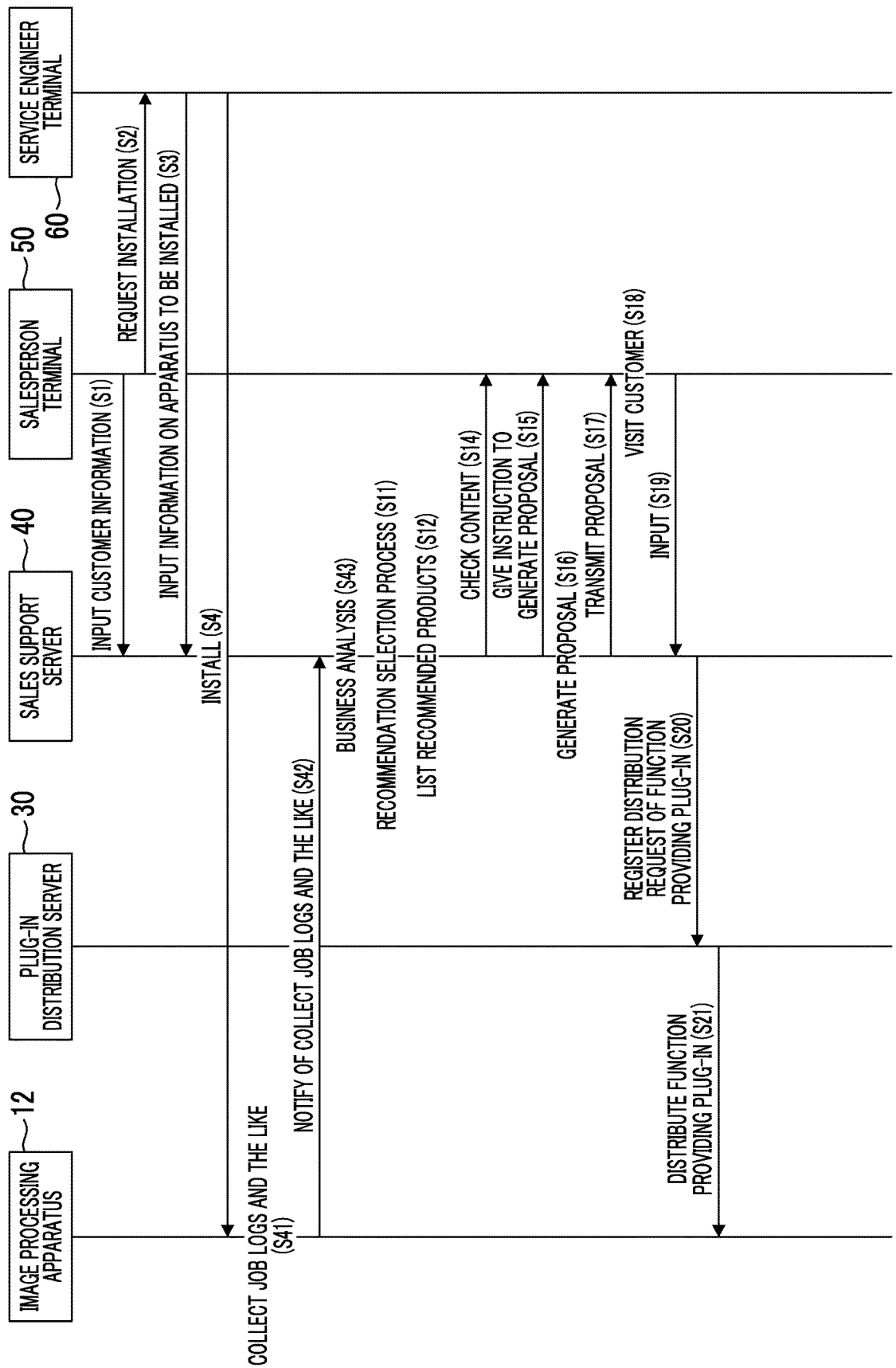

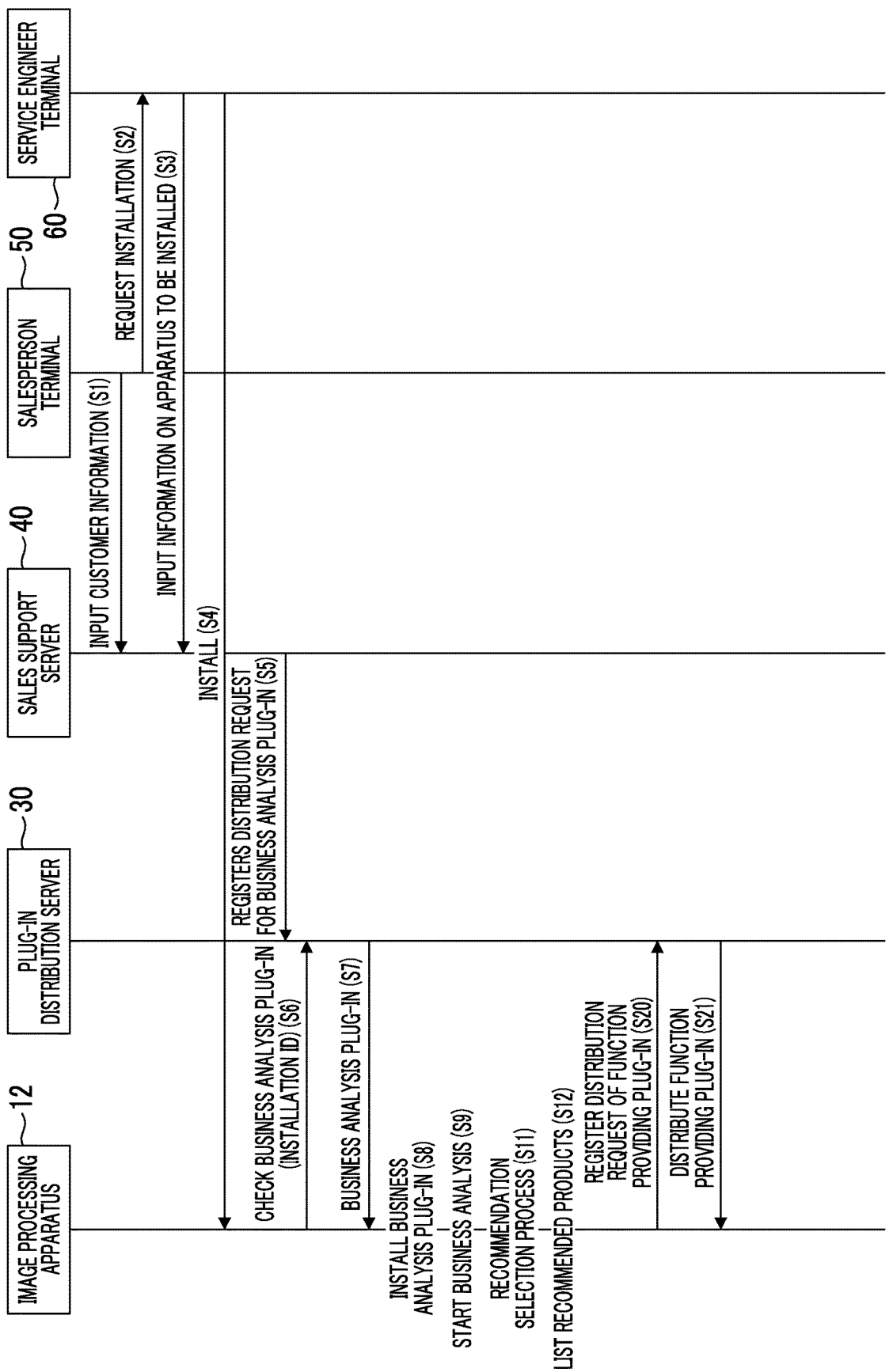

INFORMATION PROCESSING APPARATUS, SERVER APPARATUS, AND BUSINESS SYSTEM

CROSS-REFERENCE TO RELATED APPLICATIONS

This application is based on and claims priority under 35 USC 119 from Japanese Patent Application No. 2017-219533 filed Nov. 14, 2017.

BACKGROUND

(i) Technical Field

The present invention relates to an information processing apparatus, a server apparatus, and a business system.

(ii) Related Art

There is a service (managed print service: MPS) that analyzes job logs accumulated in image forming apparatuses, proposes the optimal number and models of image forming apparatuses and operates the image forming apparatuses, according to the usage situation. By providing this service, excess or deficiency concerning arrangement of facilities is solved.

SUMMARY

According to an aspect of the invention, there is provided an information processing apparatus including a collection unit that collects at least any two selected from a job log, an image log of a document, and information to be monitored through communication with a terminal present around the information processing apparatus; a classification unit that classifies at least two of the job log, the image log, and the information to be monitored collected by the collection unit by type; and an aggregation unit that aggregates results of use for combinations in which at least two types of the job log, the image log, and the information to be monitored classified by the classification unit are combined.

BRIEF DESCRIPTION OF THE DRAWINGS

Exemplary embodiment(s) of the present invention will be described in detail based on the following figures, wherein:

FIG. 8 is a diagram illustrating an example of a management table used by a business analysis plug-in management unit to manage a business analysis plug-in;

FIG. 9 is a diagram illustrating an example of a management table used by a function providing plug-in management unit to manage a function providing plug-in;

FIG. 12 is a diagram illustrating an example of a management table used for customer management;

FIG. 13 is a diagram illustrating an example of a management table used for apparatus management;

FIG. 14 is a diagram illustrating an example of a management table used by a business analysis plug-in determination unit to determine an identifier and a version of a business plug-in;

FIG. 18 is a diagram illustrating an example of a primary analysis result using a log;

FIG. 20A illustrates an example of a history of IoT communication, and FIG. 20B illustrates an example of an analysis result;

FIG. 21A illustrates an example of a history of IoT communication, and FIG. 21B illustrates an example of an analysis result;

FIG. 22 is a diagram illustrating an example of determination logic prepared for a customer having a large business scale;

FIG. 23 is a diagram illustrating an example of determination logic prepared for a customer having a small business scale;

FIG. 24 is a diagram illustrating an example of determination logic for IoT information;

FIG. 25 is a diagram illustrating an example of another system sequence;

FIG. 27 is a diagram illustrating an example of another system sequence; and FIG. 28 is a diagram illustrating an example of another system sequence.

DETAILED DESCRIPTION

Hereinafter, an exemplary embodiment will be described in detail with reference to the accompanying drawings.

EXEMPLARY EMBODIMENT 1

System Configuration

Figure 1:
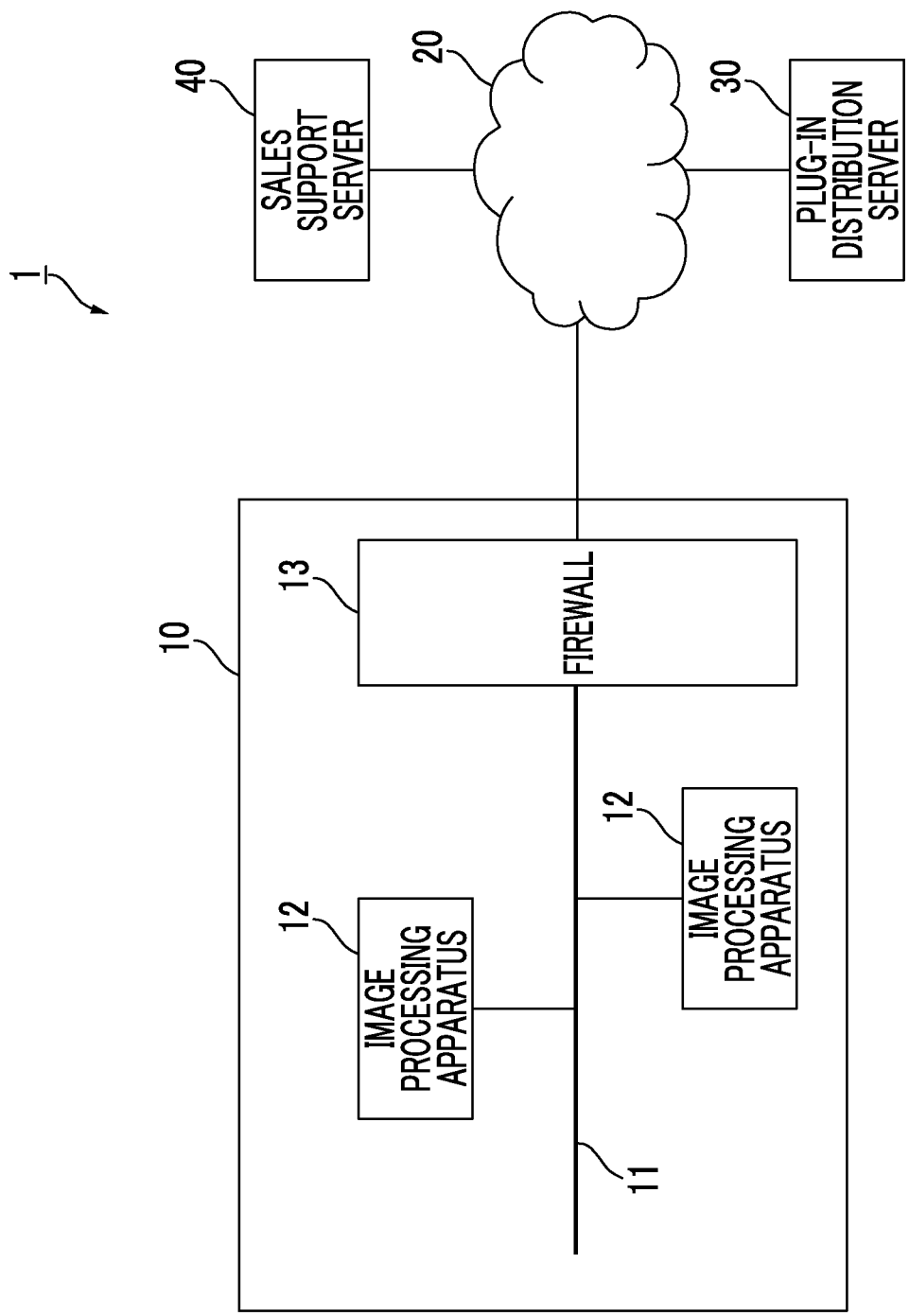
FIG. 1 is a diagram illustrating an outline of a configuration example of a business support system used in Exemplary Embodiment 1.

FIG. 1 is a diagram illustrating an outline of a configuration example of a business support system 1 used in Exemplary Embodiment 1.

The business support system 1 illustrated in FIG. 1 includes a subsystem 10 operated by a customer, the Internet 20, a plug-in distribution server 30 and a sales support server 40 present on the Internet 20.

The business support system 1 herein is an example of the business system.

The subsystem 10 illustrated in FIG. 1 is configured with two image processing apparatuses 12 connected to a local area network (LAN) 11, and a firewall 13 disposed from the viewpoint of security or the like.

The image processing apparatus 12 in the present exemplary embodiment is an example of an information processing apparatus that a customer routinely uses for the activities in business.

In the present exemplary embodiment, functions (services) to support improvement of business problems for each customer are provided by adding plug-ins (programs). Therefore, an apparatus capable of adding a plug-in is assumed for the image processing apparatus 12.

As this type of image processing apparatus 12, for example, an image forming apparatus that forms an image on a printing material (hereinafter also referred to as "paper"), a computer, an electronic blackboard or the like is assumed.

In the present exemplary embodiment, as the image processing apparatus 12, an image forming apparatus which is equipped with a copy function, a scanner function, a facsimile transceiving function, a printing function, and the like is assumed. However, the image processing apparatus 12 may be an apparatus specialized for any one function, for example, a copying machine, a scanner (including a three-dimensional scanner), a facsimile transceiver, or a printer (including a three-dimensional printer).

The number of the image processing apparatuses 12 differs for each customer, and the number may be one or may be three or more.

The firewall 13 monitors the communication between the image processing apparatus 12 and the Internet 20, and blocks communication determined to be illegal.

In the case of the present exemplary embodiment, the plug-in distribution server 30 and the sales support server 40 are managed by the manufacturer of the image processing apparatus 12 or a business person in charge of maintenance. However, the operator of the plug-in distribution server 30 and the operator of the sales support server 40 may be different from each other.

In addition, the installation and maintenance of the plug-in distribution server 30 and the sales support server 40 may be performed by the manufacturer of the image processing apparatus 12 or a business person in charge of maintenance, but may be performed by a third party like a public cloud.

The plug-in distribution server 30 and the sales support server 40 herein are examples of the server apparatus.

Configurations of Terminals Constituting System

Configuration of Image Processing Apparatus

In the present exemplary embodiment, an image forming apparatus is used as the image processing apparatus 12.

Figure 2:
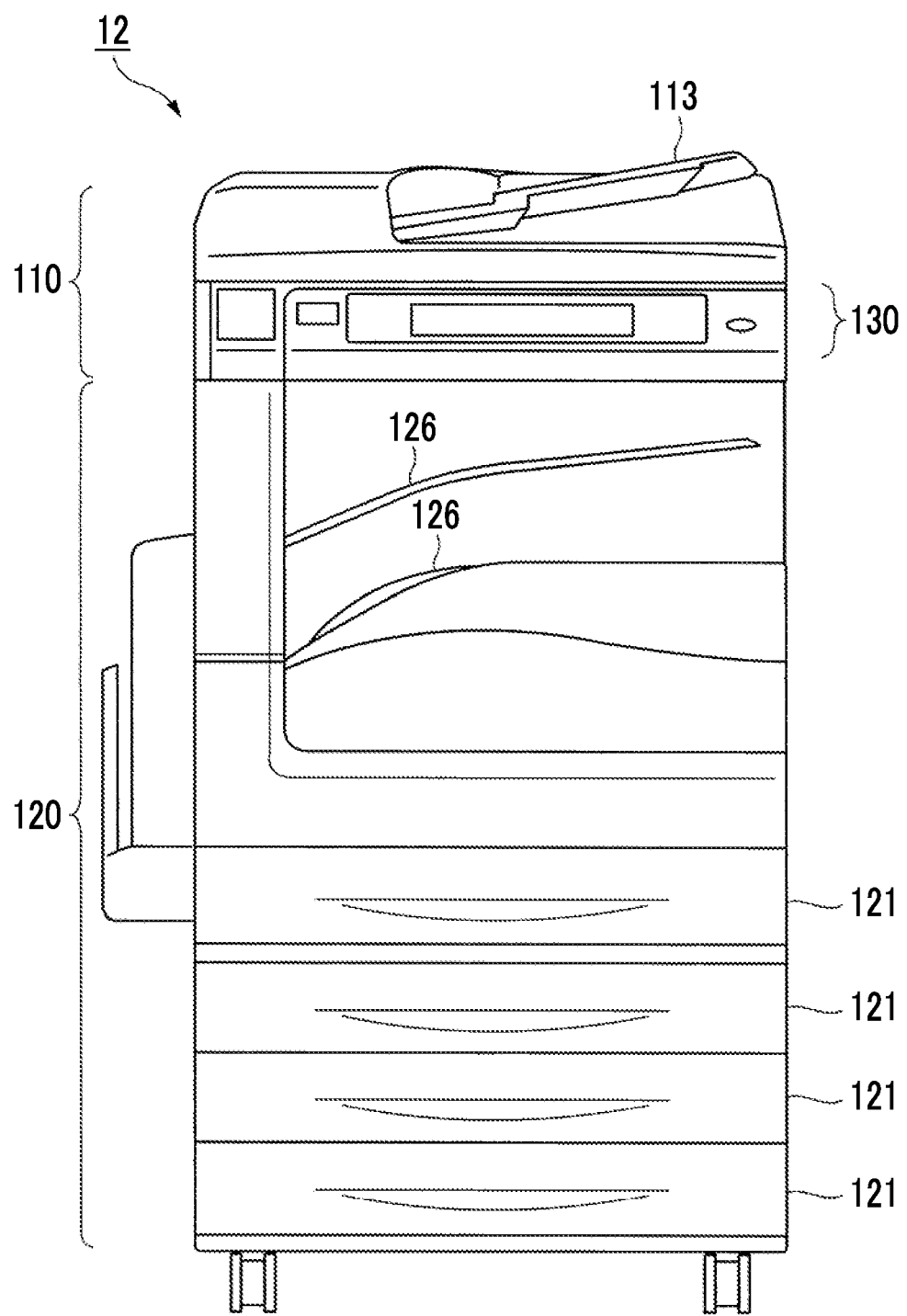
FIG. 2 is a diagram illustrating an appearance example of an image forming apparatus.
Figure 3:
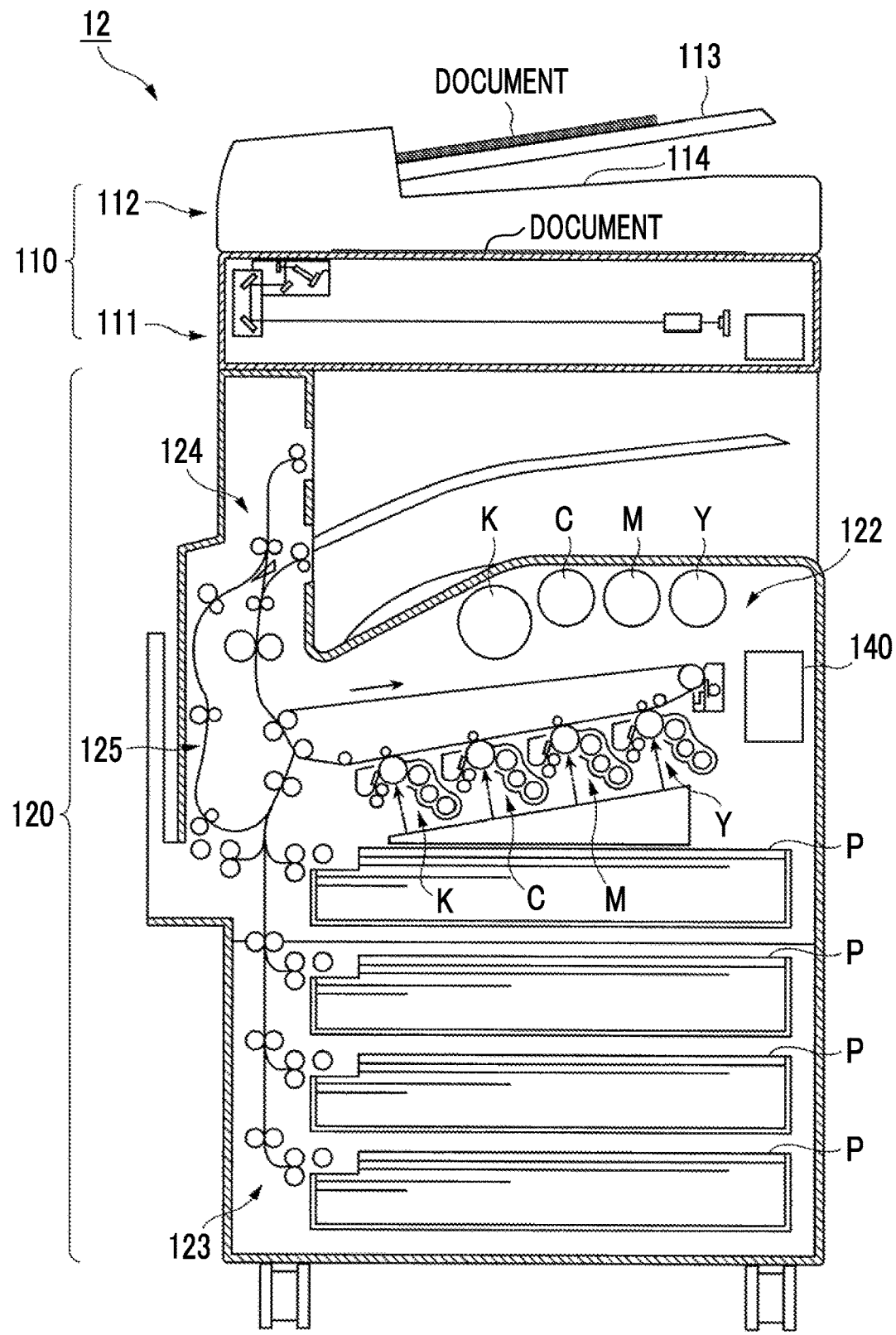
FIG. 3 is a diagram illustrating an internal structure example of the image forming apparatus.

FIG. 2 is a diagram illustrating an appearance example of an image forming apparatus. FIG. 3 is a diagram illustrating an internal structure example of the image forming apparatus.

The image forming apparatus includes an image reading apparatus 110 reading an image of a document, and an image forming apparatus 120 forming an image on a paper.

Further, the image forming apparatus is provided with a user interface (UI) 130 used for receiving operations by the user and presenting various types of information to the user. Further, the image forming apparatus includes a control device 140 that controls the operation of the entire apparatus.

The image reading apparatus 110 is mounted on an image forming apparatus 120 which constitutes a main body part of the apparatus. The image reading apparatus 110 includes an image reading unit 111 that optically reads an image formed on a document and a document transport unit 112 that transports the document to the image reading unit 111.

The document transport unit 112 includes a document accommodation unit 113 that accommodates the document and a document discharge unit 114 that discharges the document drawn out from the document accommodation unit 113. The document transport unit 112 uses a transport mechanism (not shown) to transport the document from the document accommodation unit 113 to the document discharge unit 114. The document transport unit 112 here is also referred to as an auto document feeder (ADF). In addition, it is also possible to move a reading optical system relative to the document and read the image of the document.

The image forming apparatus 120 includes a mechanism unit that forms an image on the surface of the paper and a mechanism unit that transports the paper.

The image forming apparatus 120 includes an image forming unit 122 that forms an image on the paper P drawn out from the paper tray 121, a paper supply unit 123 that supplies the paper P to the image forming unit 122, a paper discharging unit 124 that discharges the paper P on which an image is formed by the image forming unit 122, and a reversing transport unit 125 that reverses the front and back of the paper P output from the image forming unit 122 and transports again to the image forming unit 122.

Image forming units corresponding to the respective colors of yellow (Y), magenta (M), cyan (C), and black (K) are disposed along the transport path of the paper P in the image forming unit 122.

Each of the image forming units includes, for example, a photosensitive drum, a charger that charges the surface of the photosensitive drum, an exposure unit that irradiates the charged photosensitive drum with a laser beam to draw an image, a developing unit that develops the drawn image as a toner image, and a transfer unit that transfers the toner image onto the transfer belt. The toner images corresponding to the respective colors transferred onto the transfer belt are finally transferred onto the surface of the paper P and fixed by the fixing unit. The combination of color type and color here is an example.

At the bottom of the image forming apparatus 120, a paper tray 121 for accommodating the paper P is disposed. Plural discharge trays 126 for discharging the paper P on which an image is formed are provided on the upper portion of the image forming apparatus 120.

A user interface 130 is disposed on the front side of the image reading apparatus 110 such that its operation surface faces the user who operates the image forming apparatus.

The user interface 130 includes an operation receiving unit that receives instructions from the user, and a display that provides information to the user.

The operation receiving unit has, for example, a function of detecting an operation on a hardware key or a software key.

The display displays an operation screen, a software key, and the like.

The control device 140 is provided inside the casing of the image forming apparatus 120.

Figure 4:
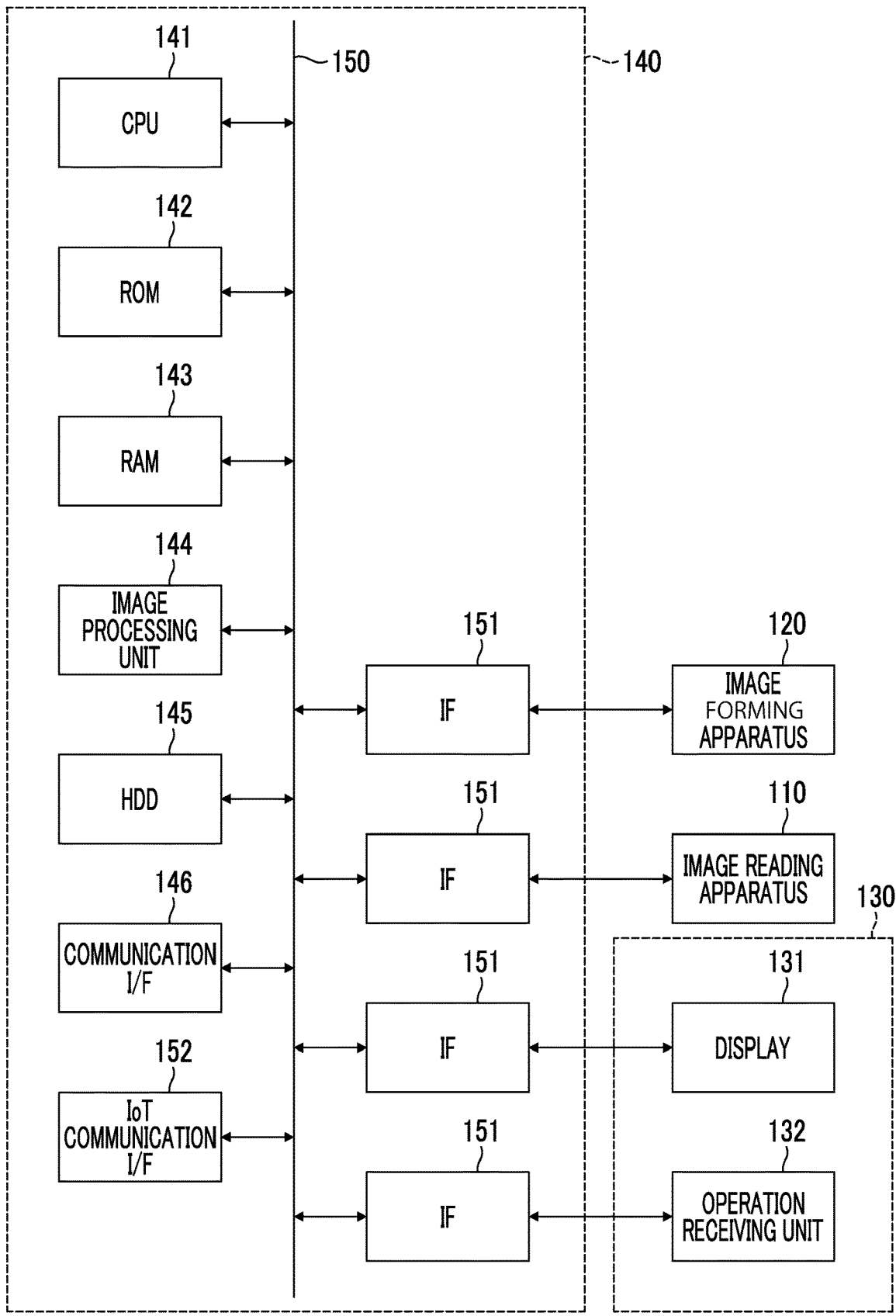
FIG. 4 is a diagram for explaining a connection relationship between a control device and another component.

FIG. 4 is a diagram for explaining a connection relationship between the control device 140 and another component.

The control device 140 includes a central processing unit (CPU) 141, a read only memory (ROM) 142 that stores firmware, a basic input/output system (BIOS), or the like, and a random access memory (RAM) 143 used as a work area of the CPU 141, which constitute a general computer.

In addition to this, the control device 140 includes an image processing unit 144 that executes various types of processes (for example, color correction, gradation correction, or the like) required for forming an image. The image processing unit 144 executes image processing using, for example, the RAM 143.

Further, the control device 140 includes a hard disk device (HDD) 145 which is an example of a nonvolatile storage device. In the HDD 145, an image read by the image reading apparatus 110, an image formed on the paper P by using the image forming apparatus 120, and programs provided from the business analysis plug-in 213 and the function providing plug-in 214 managed by the plug-in management unit 212 to be described later are stored.

In addition to the communication interface (communication IF) 146 for communicating with an external apparatus, the control device 140 includes an interface (IF) 151 connected to each unit in the apparatus, and an IoT communication interface (communication IF) 152 used for communication with an Internet of Things (IoT) device, or the like. For communication with the plug-in distribution server 30 (see FIG. 1) and the sales support server 40 (see FIG. 1), the communication interface 146 is used.

In the present exemplary embodiment, as the IoT device, for example, a sensor (thermometer, hygrometer, seismic intensity meter, or the like) disposed around the image forming apparatus, a mobile terminal possessed by a customer's employee (for example, smart phone, smart watch, a tablet, a wearable device, or the like) are assumed.

In a case where the IoT device is a sensor, the environment in the room where the image forming apparatus is installed may be known from the information measured by each device.

In a case where the IoT device is a mobile terminal, the behavior of the employee in the room may be known from the information acquired from each device.

Incidentally, the CPU 141 and each unit are connected through a bus 150. The bus 150 here may have a configuration in which plural buses are connected through a bridge.

FIG. 4 also shows a display 131 used for displaying the operation screen and an operation receiving unit 132 that receives a user's operation, as an example of elements constituting the user interface 130. For example, a touch panel is used as the operation receiving unit 132.

Functional Configuration of Image Forming Apparatus

Figure 5:
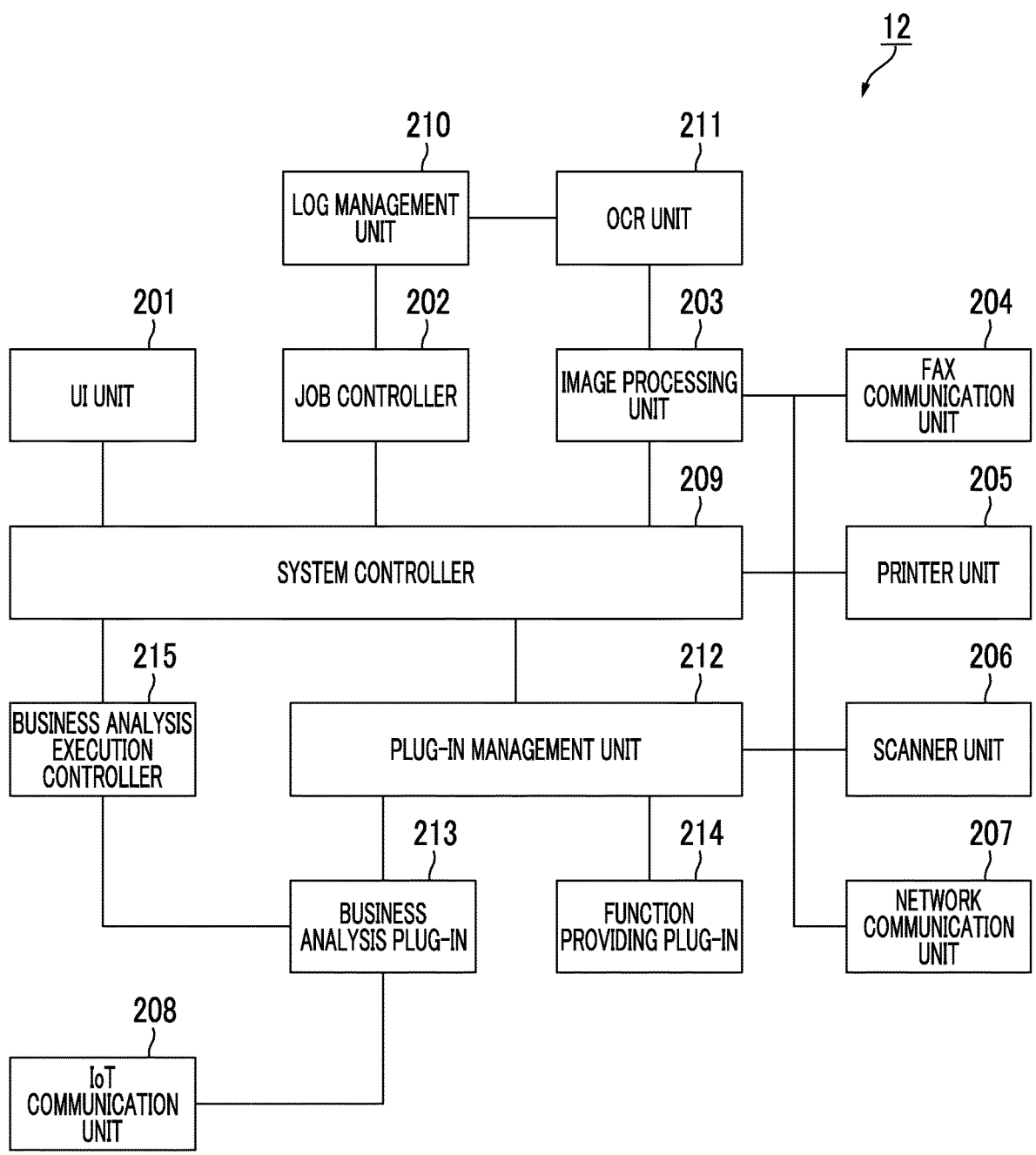
FIG. 5 is a diagram for explaining a functional configuration of the image forming apparatus.

FIG. 5 is a diagram for explaining a functional configuration of the image forming apparatus. The individual functional units are provided through execution of a program by the control device 140 (see FIG. 4).

The user interface unit (UI unit) 201 is a functional unit that displays the internal state of the apparatus, the job status, function buttons and the like on the display 131 (see FIG. 4), and also receives the operation or input of the user through the operation receiving unit 132 (see FIG. 4).

The job controller 202 is a functional unit that controls start, stop, and completion of a job (for example, copy, print, scan, and fax) executed by the image forming apparatus.

The image processing unit 203 is a functional unit that realizes respective functions such as fax, copy, print, scan, and the like, in cooperation with a facsimile (fax) communication unit 204, a printer unit 205, a scanner unit 206, and a network communication unit 207.

The facsimile communication unit 204 is a functional unit that performs facsimile communication of image data with another facsimile machine.

The printer unit 205 is a functional unit that controls copying and printing.

The scanner unit 206 is a functional unit that scans a document and reads an image.

The network communication unit 207 is a functional unit that executes reception of a plug-in, transmission of business analysis data (a result of primary analysis), network communication of image data, and the like.

The IoT communication unit 208 is a functional unit that communicates with an IoT device such as a sensor or a mobile terminal through the IoT communication interface 152 (see FIG. 4) using a protocol such as Bluetooth (registered trademark) low energy (BLE) or WiFi.

The system controller 209 is a functional unit that controls the operation of the entire apparatus.

The log management unit 210 is a functional unit that manages a log (job log) of a job executed by the image forming apparatus and a log (image log) of a document processed by the image forming apparatus. The log management unit 210 is an example of collection unit.

The optical character recognition (OCR) unit 211 is a functional unit that executes a OCR process for optically reading characters described in a document to be scanned and converting the characters into a string of character codes (text) and also executes an OCR process for converting the image of the document stored as an image log into a string of character codes (text).

The plug-in management unit 212 is a functional unit that controls registration, deletion, and execution of plug-ins (for example, business analysis plug-in and function providing plug-in) received from the plug-in distribution server 30 (see FIG. 1). The plug-in management unit 212 is an example of an acquisition unit.

A plug-in is a program different from firmware, and is used in a case of adding individual functions to firmware that provides common functions. The plug-in is written in, for example, Java (registered trademark) language.

The plug-in management unit 212 also includes a platform for operating the plug-in. For example, the Java virtual machine (VM) is a platform for operating the plug-in written in Java language.

The business analysis plug-in 213 is a program for primary analysis of business problems, by processing job logs, image logs, IoT information (information collected from IoT devices), and the like. The business analysis plug-in 213 is an example of a second plug-in.

The business analysis plug-in 213 used in the present exemplary embodiment is selected according to the type and scale of the customer's business.

In the present exemplary embodiment, the scale is distinguished based on the type of business and the number of employees. However, other indices such as the amount of sales or capital may be used to distinguish the scale.

By installing the business analysis plug-in 213 selected according to the type and scale of the customer's business in the image forming apparatus, it is unnecessary to collect data that is irrelevant to the customer's activities in business, and thus improvement in analysis accuracy and efficiency can be realized.

However, a system configuration in which the business analysis plug-in 213 is not installed in the image forming apparatus is also conceivable. For example, the same function may be realized by mounting the function of analyzing business problems in the ROM 142 as the firmware of the control device 140 and switching the control according to the type and scale of the customer's business.

The business analysis plug-in 213 uses the job log and the image log stored in the log management unit 210 for analysis.

In a case of analyzing the image log, the business analysis plug-in 213 requests the OCR unit 211 to perform OCR processing and analyzes the result of the OCR processing.

The business analysis plug-in 213 also has a function of classifying job logs by type and a function of classifying image logs by type. The function of classifying job logs by type is an example of a job classification unit. The function of classifying image logs by type is an example of an image classification unit.

In addition, the business analysis plug-in 213 aggregates and analyzes various types of IoT information through the IoT communication unit 208.

For example, the business analysis plug-in 213 receives a BLE beacon emitted from a mobile terminal (for example, a smartphone, a smart watch, a tablet, a wearable device, or the like) possessed by the user moving near the image processing apparatus, aggregates and analyzes the attendance time and the work line of the user.

Further, for example, the business analysis plug-in 213 receives a BLE beacon emitted from a sensor (a thermometer, a hygrometer, a seismic intensity meter, or the like), aggregates and analyzes a change in environment of the installation space (temperature (air temperature), humidity, seismic intensity, or the like). The function here is an example of an aggregation unit.

In addition, in a case where the installed image forming apparatus cannot use the BLE protocol, the business analysis plug-in 213 is installed in the image forming apparatus, so that the BLE protocol can be newly used at the IoT communication interface 152, and BLE connection with any new IoT device may be made. In this case, after the installation of the business analysis plug-in, the above-described analysis is performed without problems.

The business analysis plug-in 213 also has a function of aggregating the results of use of combinations of types of job logs and types of image logs. The function here is an example of an aggregation unit.

The function providing plug-in 214 is a program for providing a function of supporting improvement of the customer's business problems clarified by analysis.

The function providing plug-in 214 realizes, for example, cooperation with a cloud service, connection by a new protocol with a new IoT device, and the like. The function providing plug-in 214 here is an example of the first plug-in.

The business analysis execution controller 215 is a functional unit that controls the operation period of the business analysis plug-in 213.

The business analysis execution controller 215 controls a period in which the business analysis plug-in 213 operates such that the performance of the basic functions (copy, print, scan, and fax) of the image forming apparatus and the extended function provided by the function providing plug-in 214 does not deteriorate.

The business analysis execution controller 215 selects a time during which the user does not use the apparatus (for example, outside the business hours such as late-night), and an idle time in which the function is not used even within the business hours and permits the execution of the business analysis plug-in 213.

On the other hand, in a case where the basic function of the image processing apparatus 12 is used, the business analysis execution controller 215 temporarily stops execution of the business analysis plug-in 213.

In other words, the business analysis plug-in 213 is executed by selecting a preset period or a period during which job is not executed, and it is not executed in a case where a job is being executed or a job to be executed is not present. However, it may be possible to control the period of execution only for a part of the functions of the business analysis plug-in 213 (for example, aggregation of the results of use), and not to control the time for the remaining functions. In a case where the image processing apparatus 12, that is communicable with the communication interface 146 and has the business analysis plug-in 213 installed, is externally present, the job logs, the image logs, and various types of IoT information stored in the log management unit 210 are transmitted, and the external image processing apparatus 12 may execute the business analysis plug-in 213.

Further, the function providing plug-in 214 basically operates when the user is using the apparatus.

Configuration of Plug-in Distribution Server

Figure 6:
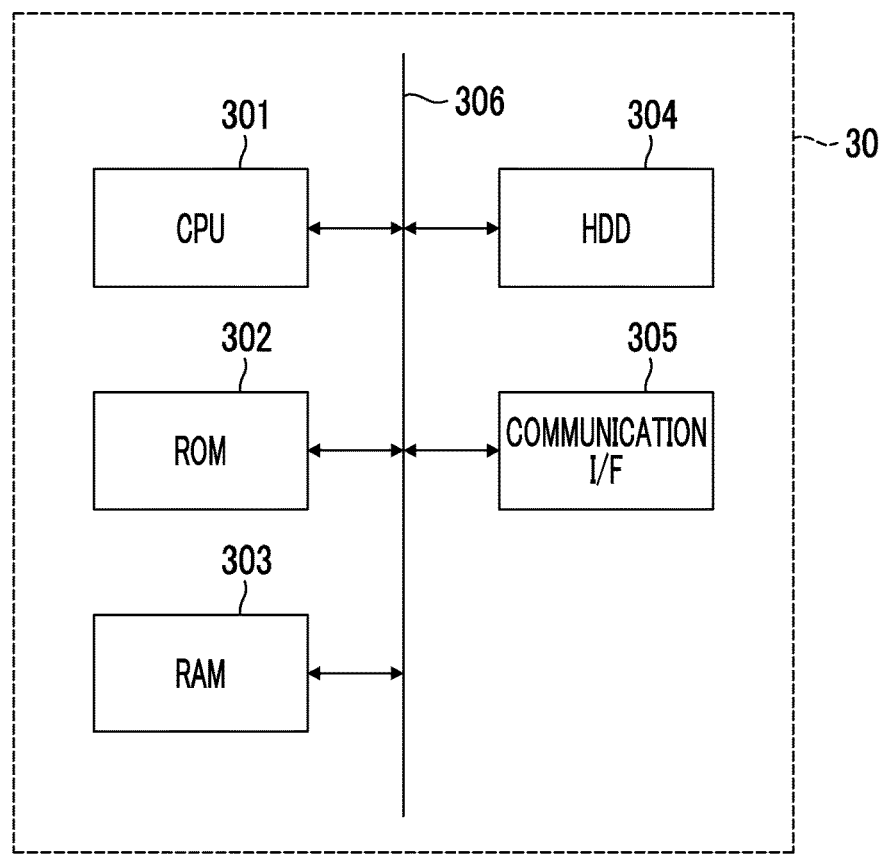
FIG. 6 is a diagram illustrating an internal configuration example of the plug-in distribution server.

FIG. 6 is a diagram illustrating an internal configuration example of the plug-in distribution server 30 (see FIG. 1).

The plug-in distribution server 30 has a basic configuration as a computer, and includes a CPU 301, a ROM 302 in which a BIOS or the like is stored, a RAM 303 used as a work area of the CPU 301, a hard disk device (HDD) 304 in which data or programs (including an operation system) is stored, and a communication interface (communication IF) 305 used for communication with the outside.

The CPU 301 and each unit are connected through a bus 306.

The function of the plug-in distribution server 30 is realized by the CPU 301 executing a program.

Figure 7:
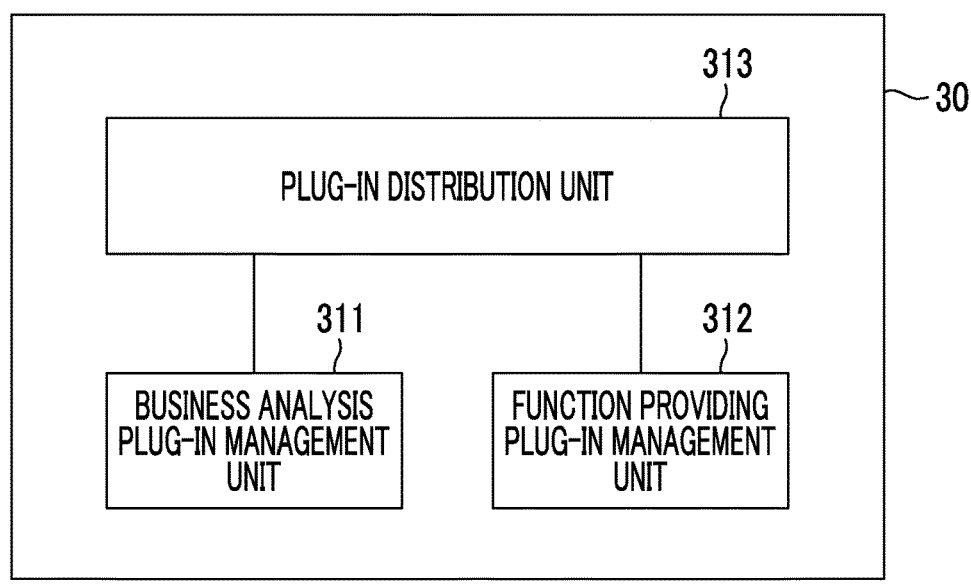
FIG. 7 is a diagram illustrating a functional configuration example of the plug-in distribution server.

FIG. 7 is a diagram illustrating a functional configuration example of the plug-in distribution server 30.

The plug-in distribution server 30 includes a business analysis plug-in management unit 311 that manages the business analysis plug-in 213 (see FIG. 5) used for primary analysis of business problems, a function providing plug-in management unit 312 that manages the function providing plug-in 214 (see FIG. 5) used to promote efficiency of the business with problems, and a plug-in distribution unit 313 that distributes plug-ins corresponding to individual customers (or corresponding to individual image forming apparatuses) to the target apparatus, based on a request from the sales support server 40 (see FIG. 1).

In a case of receiving a distribution request of the business analysis plug-in 213 from the sales support server 40, the plug-in distribution unit 313 extracts a target business analysis plug-in 213 from the business analysis plug-in management unit 311 and registers the distribution command to a distribution queue. Here, the distribution request is composed of an apparatus identifier (ID) for specifying a distribution destination and a plug-in identifier (ID) for specifying a plug-in. The plug-in distribution unit 313 related to this function is an example of a second distribution unit.

In a case of receiving a distribution request of the function providing plug-in 214 from the sales support server 40, the plug-in distribution unit 313 extracts a target function providing plug-in 214 from the function providing plug-in management unit 312 and registers the distribution command to a distribution queue. The plug-in distribution unit 313 related to this function is an example of a distribution unit.

FIG. 8 is a diagram illustrating an example of a management table used by the business analysis plug-in management unit 311 to manage the business analysis plug-in 213 (see FIG. 5). The business analysis plug-in 213 is prepared, for example, for each combination of the type of business and the scale thereof. In the example of FIG. 8, plug-in identifiers (for example, WA_PLUGIN-01) and version information (for example, V 1.0.0) for distinguishing the business analysis plug-in 213 are recorded.

FIG. 9 is a diagram illustrating an example of a management table used by the function providing plug-in management unit 312 to manage the function providing plug-in 214 (see FIG. 5). The function providing plug-in 214 is provided for each combination of, for example, a scale and an extending function (or extending service). In the example of FIG. 9, a plug-in identifier (for example, FO_PLUGIN-01) and version information (for example, V 1.0.0) for distinguishing the function providing plug-in 214 are recorded.

Configuration of Sales Support Server

Figure 10:
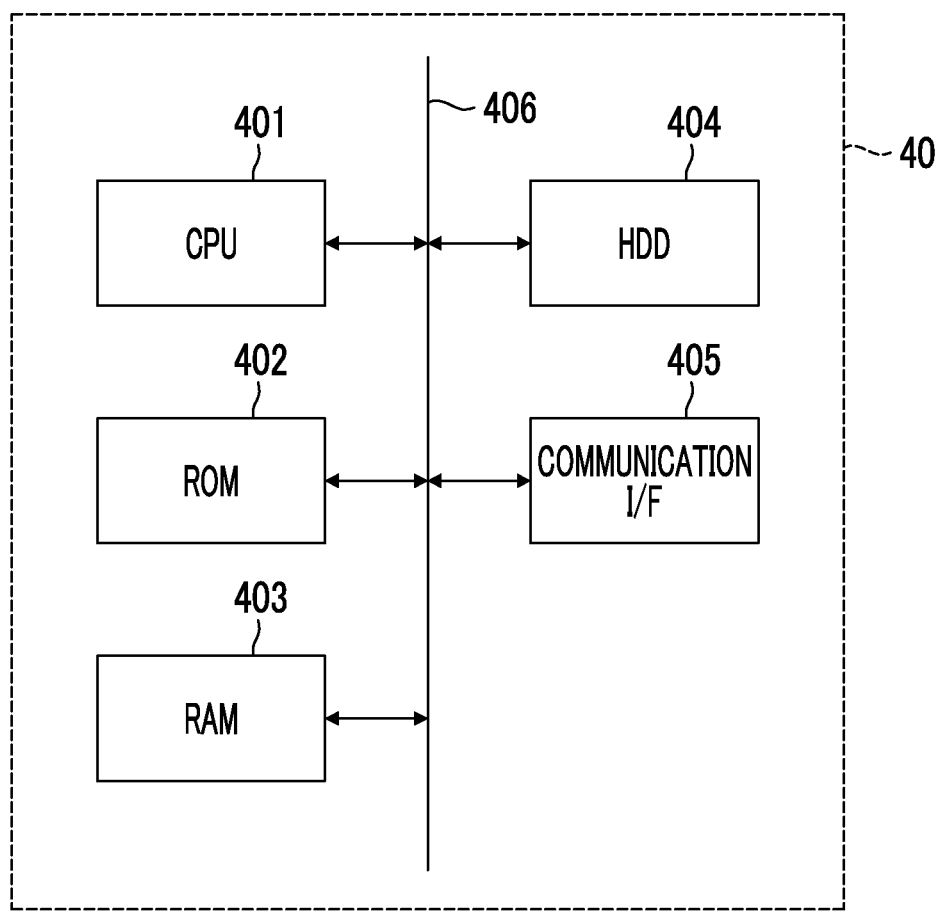
FIG. 10 is a diagram illustrating an internal configuration example of a sales support server.

FIG. 10 is a diagram illustrating an internal configuration example of the sales support server 40.

The sales support server 40 has a basic configuration as a computer, and includes a CPU 401, a ROM 402 in which a BIOS or the like is stored, a RAM 403 used as a work area of the CPU 401, a hard disk device (HDD) 404 in which data or programs (including an operation system) is stored, and a communication interface (communication IF) 405 used for communication with the outside.

The CPU 401 and each unit are connected through a bus 406.

The function of the sales support server 40 is realized by the CPU 401 executing a program.

Figure 11:
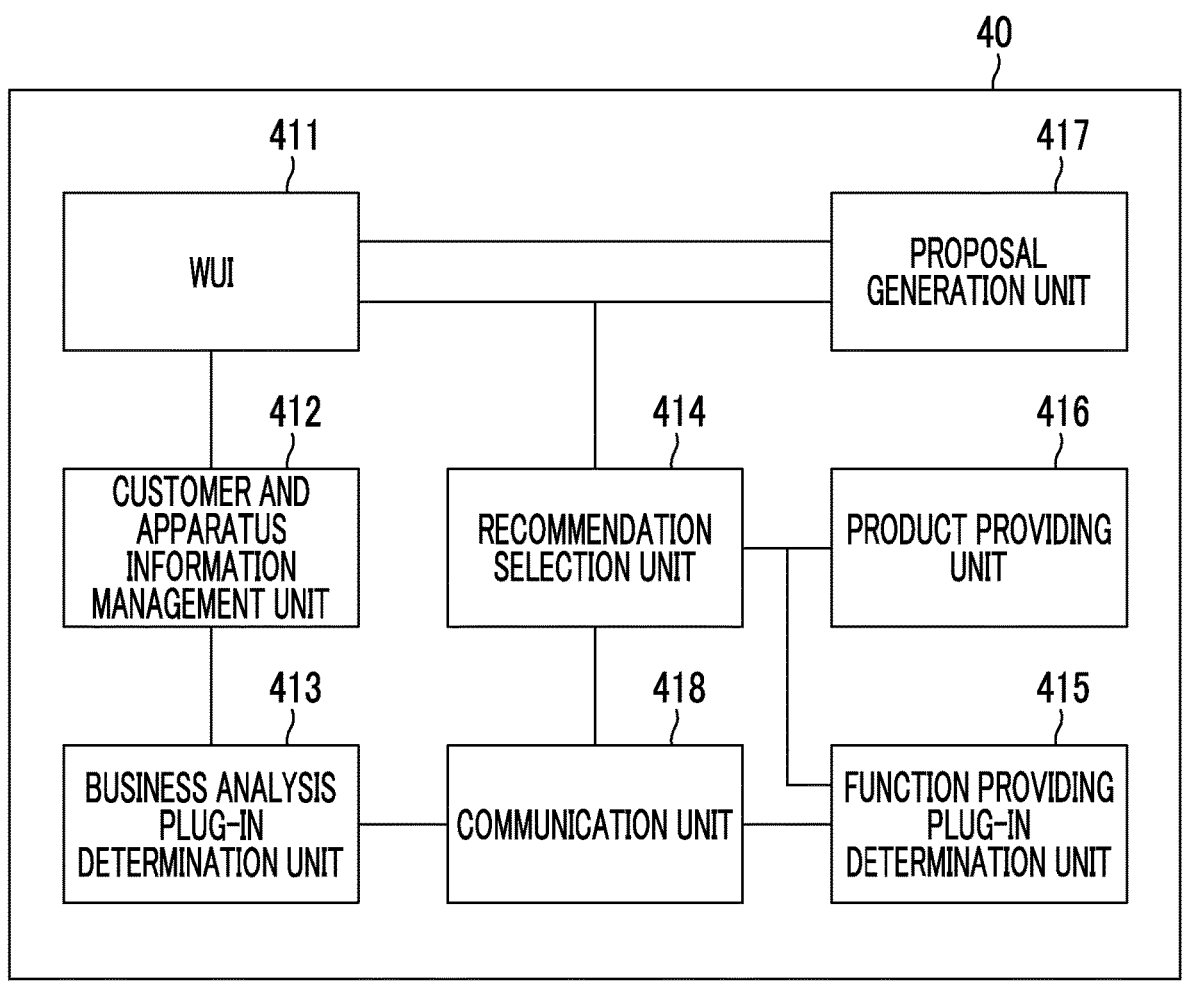
FIG. 11 is a diagram illustrating a functional configuration example of the sales support server.

FIG. 11 is a diagram illustrating a functional configuration example of the sales support server 40.

The web user interface (WUI) 411 is a functional unit that transmits an operation screen as a web page to a web browser of a computer, for example.

A salesperson or a service engineer gives an instruction to the sales support server 40 through the operation screen.

The web user interface (WUI) 411 transmits, for example, a work screen used by a salesperson for registering information on a new customer.

The customer and apparatus information management unit 412 is a functional unit that manages customer information and apparatus information. The customer information includes, for example, the customer's name (customer's identifier (ID)), the type of the customer's business, the business scale, or the like. The apparatus information includes, for example, a customer's name (customer's identifier (ID)), an installed apparatus (an apparatus identifier (ID)), and the like.

In a case where a new apparatus is registered for the customer, the customer and apparatus information management unit 412 instructs the business analysis plug-in determination unit 413 to determine a business analysis plug-in 213 (see FIG. 5) to be distributed.

FIG. 12 is a diagram illustrating an example of a management table used for customer management. In the management table illustrated in FIG. 12, the business type and the business scale are associated with the customer ID. For example, the business type "CUSTOMER 01" is a manufacturing industry and is a medium-scale business entity employing 20 to 300 employees. In addition, the business type "CUSTOMER 02" is a service industry, it is a small-scale business entity employing five or fewer employees. The number of employees used for classifying business scale differs between a manufacturing industry and a service industry.

FIG. 13 is a diagram illustrating an example of a management table used for apparatus management. In the management table illustrated in FIG. 13, an apparatus ID is associated with a customer ID. For example, "CUSTOMER 02" has two apparatuses installed. The type and performance of an apparatus are checked by the apparatus ID.

Return to the description of FIG. 11.

The business analysis plug-in determination unit 413 acquires the business type and the business scale of the customer of the customer ID associated with the image processing apparatus 12 corresponding to the apparatus ID, from the customer information and the apparatus information managed by the customer and apparatus information management unit 412, determines a business analysis plug-in 213 (see FIG. 5) compatible with the business type and the business scale, based on the plug-in identifier (ID) and version (Ver), and instructs the plug-in distribution server 30 (see FIG. 1) to distribute the determined business analysis plug-in 213 to the corresponding image processing apparatus 12 (see FIG. 1).

FIG. 14 is a diagram illustrating an example of a management table used by the business analysis plug-in determination unit 413 to determine an identifier (ID) and a version (Ver) of a business plug-in.

In the management table illustrated in FIG. 14, the identifier (ID) and the version (Ver) of the business analysis plug-in are managed in association with each other for each combination of the business type and the business scale. The division of business scale differs between a manufacturing industry and a service industry. For example, in the manufacturing industry, there are 300 or more employees on a large scale. In the service industry, there are 100 or more employees on a large scale. Different categories are also used for medium and small scale. In this way, by preparing a business analysis plug-in according to the business type and the business scale, it is possible to perform primary analysis of the tasks according to customers, and to perform an efficient and highly accurate analysis.

Return to the description of FIG. 11.

A recommendation selection unit 414 is a functional unit that analyzes business problems specific to a customer (or apparatus) from the result of a primary analysis received from the image processing apparatus 12 (specifically, the business analysis plug-in 213).

The recommendation selection unit 414 receives information on the function providing plug-in 214 (see FIG. 5) and products (services) expected to be effective in improving the problems in the specified business or expected to improve the efficiency of business, from each of the function providing plug-in determination unit 415 and the product providing unit 416.

In the present exemplary embodiment, it is assumed a case where the function provided by the function providing plug-in determination unit 415 and the products (service) provided by the product providing unit 416 are independent, but in a case where the function and the product cooperate with each other, it is desirable that combination information is provided to the recommendation selection unit 414.

In addition, the function providing plug-in determination unit 415 prepares a management table in which functions are associated with problems in the specified business. In addition, the product providing unit 416 prepares a management table in which products (services) are associated with problems in the specified business.

The recommendation selection unit 414 presents a task in business of the specified customer and the content of the function providing plug-in 214 and the product (service) recommended for each task through the work screen.

A proposal generation unit 417 is a functional unit that collects the determination by each of the recommendation selection unit 414, the function providing plug-in determination unit 415, and the product providing unit 416, and generates a proposal for a customer, in response to the instruction of the salesperson. The proposal is generated based on a form prepared in advance.

The proposal generation unit 417 also has a function of receiving orders from salespersons. In a case of receiving the order, the proposal generation unit 417 registers the distribution job of the specific function providing plug-in 214 (see FIG. 5) for which the order is received, in the distribution queue of the plug-in distribution server 30 (see FIG. 1) and changes the content of the registration so that the product (service) can be used.

The communication unit 418 is a functional unit that realizes network communication with a web browser of a terminal operated by a salesperson, the plug-in distribution server 30, and the image processing apparatus 12 (see FIG. 1).

System Sequence

Figure 15:
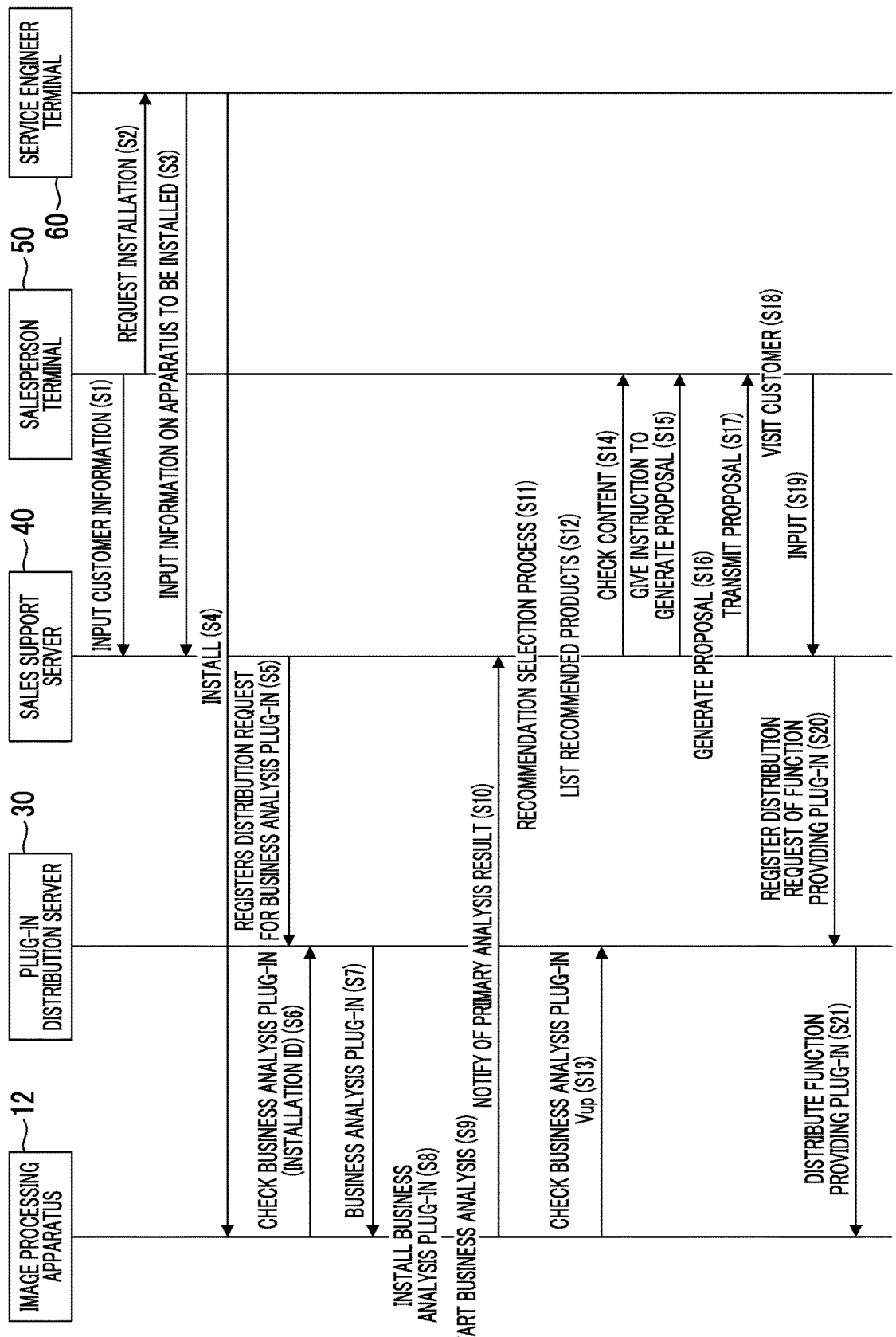
FIG. 15 is a diagram for explaining an outline of a system sequence according to Exemplary Embodiment 1.

FIG. 15 is a diagram for explaining an outline of a system sequence according to Exemplary Embodiment 1.

In FIG. 15, terminals operated by a salesperson and a service engineer who can access the sales support server 40 through the operation screen displayed on the web browser are represented as a salesperson terminal 50 and a service engineer terminal 60.

Step 1

First, the salesperson inputs (registers) customer information (the customer ID, the business type, and the business scale) to the sales support server 40 through the work screen displayed on the salesperson terminal 50. The customer's information is managed by the customer and apparatus information management unit 412 (see FIG. 11).

Step 2

In a case of installing the image processing apparatus 12, the salesperson accesses the service engineer terminal 60 and makes a request for installation of the apparatus. The content of the request includes the apparatus ID and information on a place to install an apparatus.

Step 3

Through the work screen displayed on the service engineer terminal 60, the service engineer inputs (registers) the information on the apparatus to be installed in association with the customer ID. Information on the apparatus is managed by the customer and apparatus information management unit 412 (see FIG. 11). Further, the information on the apparatus may also be registered by the salesperson.

Step 4

The service engineer installs the requested image processing apparatus 12 at the designated place.

Step 5

The sales support server 40 determines a business analysis plug-in 213 (see FIG. 5), based on the business type and the business scale of the customer corresponding to the installed image processing apparatus 12, and registers a distribution request of the business analysis plug-in 213 in the plug-in distribution server 30. The business analysis plug-in determination unit 413 (see FIG. 11) determines the business analysis plug-in 213 to be distributed.

Even in a case where the distribution request is registered, delivery of the business analysis plug-in 213 is not executed. This is because the address on the Internet of the image processing apparatus 12 which is the distribution destination of the business analysis plug-in 213 is unknown.

Step 6

After completion of the installation, the image processing apparatus 12 notifies the plug-in distribution server 30 of its own apparatus ID and checks the presence or absence of the business analysis plug-in 213 (see FIG. 5) to be installed. At this time, the plug-in distribution server 30 uses the received apparatus ID as a search key and collates it with the apparatus ID registered as a target of the distribution request.

Step 7

In a case where the apparatus ID is registered, the plug-in distribution server 30 distributes the business analysis plug-in 213 selected according to the type and scale of the customer's business, to a target image processing apparatus 12.

Step 8

The image processing apparatus 12 installs the received business analysis plug-in 213. By the installation, the functions of the image processing apparatus 12 are customized according to the type and scale of the customer's business.

Step 9

The image processing apparatus 12 starts analyzing the business of the customer using the business analysis plug-in 213. The analysis (primary analysis) by the business analysis plug-in 213 is executed under the control of the business analysis execution controller 215 (see FIG. 5) at a time when the image processing apparatus 12 is not in use.

In this analysis, some logs (job logs and image logs) or IoT information narrowed down according to the type and scale of the customer's business are analyzed.

In the case of the present exemplary embodiment, the occurrence frequency and the occurrence amount are aggregated according to the content of the business specified by the combination of the type of the job log and the type of the image log. In addition, information on the environment where the business is conducted and information on the work of each person are analyzed from the IoT information.

First, an operation example of primary analysis using logs will be described with reference to FIGS. 16 to 18.

Figure 16:
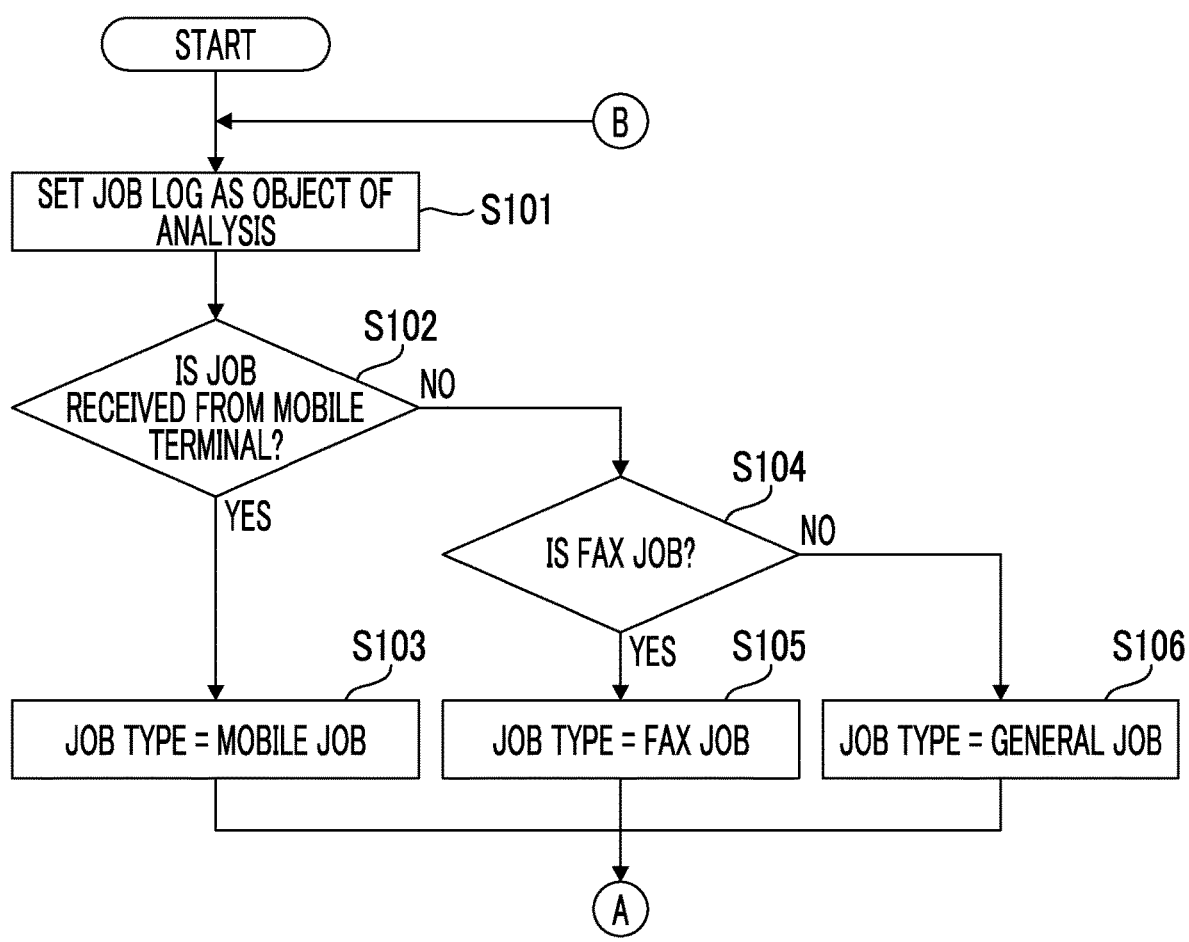
FIG. 16 is apart of a flowchart for explaining a procedure of a log analysis operation according to Exemplary Embodiment 1.

FIG. 16 is apart of a flowchart for explaining a procedure of a log analysis operation according to Exemplary Embodiment 1. FIG. 17 is the rest of the flowchart for explaining the procedure of the log analysis operation according to Exemplary Embodiment 1. FIG. 18 is a diagram illustrating an example of a primary analysis result using a log.

First, explanation will be given reference to FIG. 16.

First, the business analysis plug-in 213 (see FIG. 5) sets the job log as an object of analysis (step 101). In the following analysis, the job log is classified by type.

In the case of FIG. 16, in step 102, it is determined whether or not the job is a job received from a mobile terminal. In a case where a positive result is obtained in step 102, the job type is set to a mobile job (step 103).

In a case where a negative result is obtained in step 102, it is determined whether or not the job is a fax job (step 104). In a case where a positive result is obtained in step 104, the job type is set to the fax job (step 105). In a case where a negative result is obtained, the job type is set to the general job (step 106).

Figure 17:
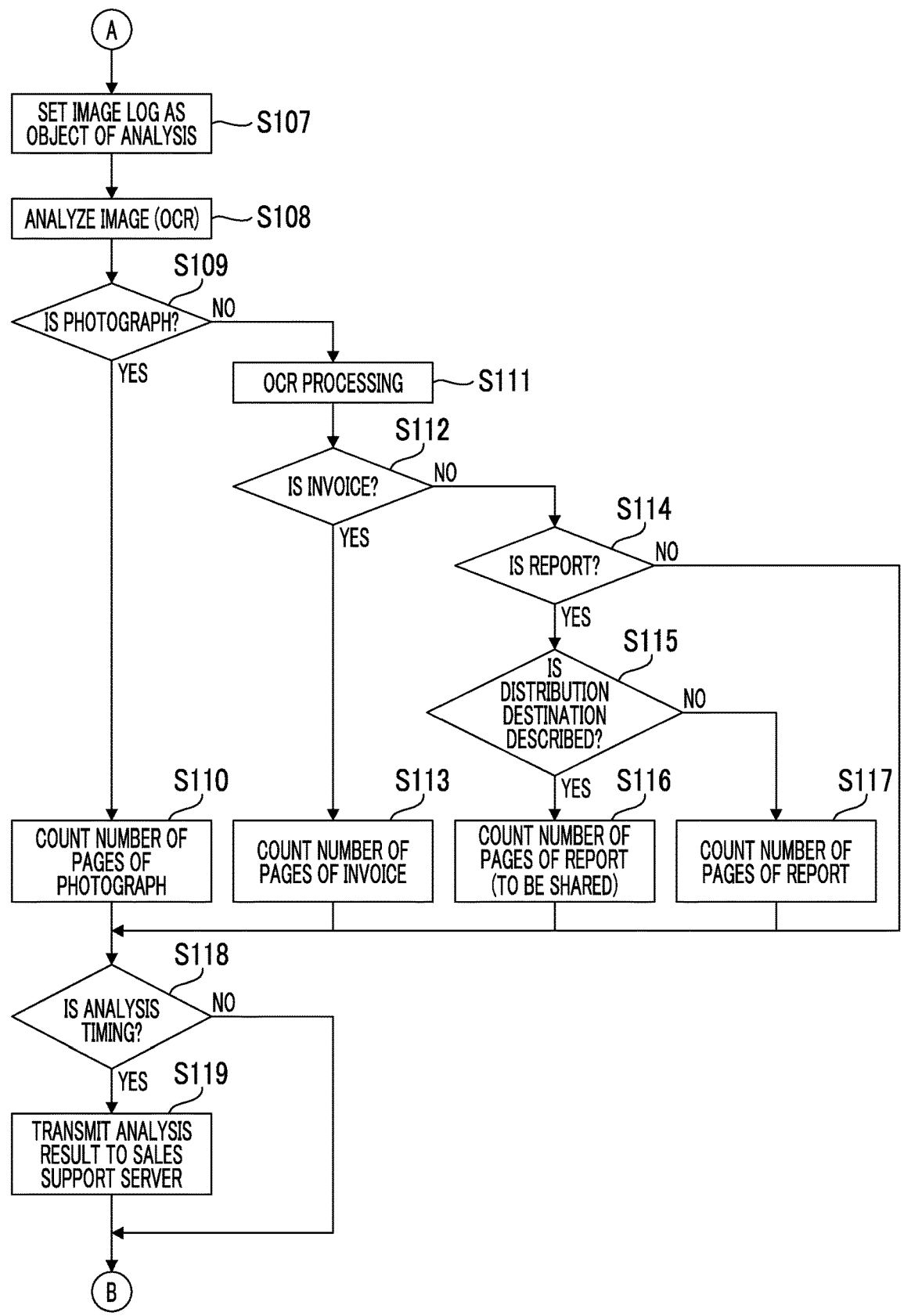
FIG. 17 is the rest of the flowchart for explaining the procedure of the log analysis operation according to Exemplary Embodiment 1.

Proceed to the description of FIG. 17.

Next, the business analysis plug-in 213 (see FIG. 5) sets the image log as an object of analysis (step 107). In the following analysis, the image log is classified by type.

In the example of FIG. 17, in step 108, the type of an image is analyzed. In this analysis, OCR processing is also used as necessary. In this analysis, it is specified whether the image is a photograph or a document.

In step 109, it is determined whether or not the image is a photograph. In a case where a positive result is obtained in step 109, the business analysis plug-in 213 counts the number of pages of the photograph (step 110).

In a case where a negative result is obtained in step 109 (in a case where the image is a document), the business analysis plug-in 213 performs OCR processing using the OCR unit 211 (see FIG. 5) and specifies the contents of the image (step 111). For example, based on the title of the document, it is specified whether the document to be processed is an invoice, a report, or the like.

In step 112, it is determined whether or not the image is an invoice. In a case where a positive result is obtained in step 112, the business analysis plug-in 213 counts the number of pages of the invoice (step 113).

In a case where a negative result is obtained in step 112, the business analysis plug-in 213 determines whether or not the image is a report (step 114). In a case where a positive result is obtained in step 114, the business analysis plug-in 213 further determines whether or not a distribution destination is described (step 115).

In a case where a positive result is obtained in step 115, the business analysis plug-in 213 classifies the report as a report to be shared and counts the number of pages of the report (step 116).

In a case where a negative result is obtained in step 115, the business analysis plug-in 213 classifies the report as a report not to be shared and counts the number of pages of the report (step 117).

After execution of step 110, after execution of step 113, after execution of step 116, after execution of step 117, or in a case where a negative result is obtained in step 114, the business analysis plug-in 213 determines whether or not the current time is an analysis timing (step 118).

In a case where a negative result is obtained in step 118, the business analysis plug-in 213 returns to step 101 (FIG. 16) and repeats the previous processing.

In a case where a positive result is obtained in step 118, the business analysis plug-in 213 executes analysis processing and transmits the result to the sales support server 40 (step 119). Thereafter, the business analysis plug-in 213 returns to step 101 (FIG. 16) and repeats the previous processing.

In the present exemplary embodiment, as the analysis of step 119, the results of use are aggregated for combinations of types of job logs and types of image logs. The job type and document type used for classification are prepared by the business analysis plug-in 213 according to the business type and the business scale. In a case where this type is not related to the content of the business or it is not consistent, it affects the finding of the business problem corresponding to the customer.

In the example of the aggregation result shown in FIG. 18, three types of jobs (mobile job, FAX job, general job) and three types of documents (invoice, report (to be shared), report) are illustrated as the job types and document types, respectively. Further, an item of a photograph may be included as the type of image.

From the results of the analysis shown in FIG. 18, it is found that the use in the invoice of the general job is the most frequent, and then the use in the report (to be shared) of the general job and the use in the report of the mobile job are many.

First, an example of the primary analysis operation using IoT information will be described with reference to FIGS. 19 to 21.

Figure 19:
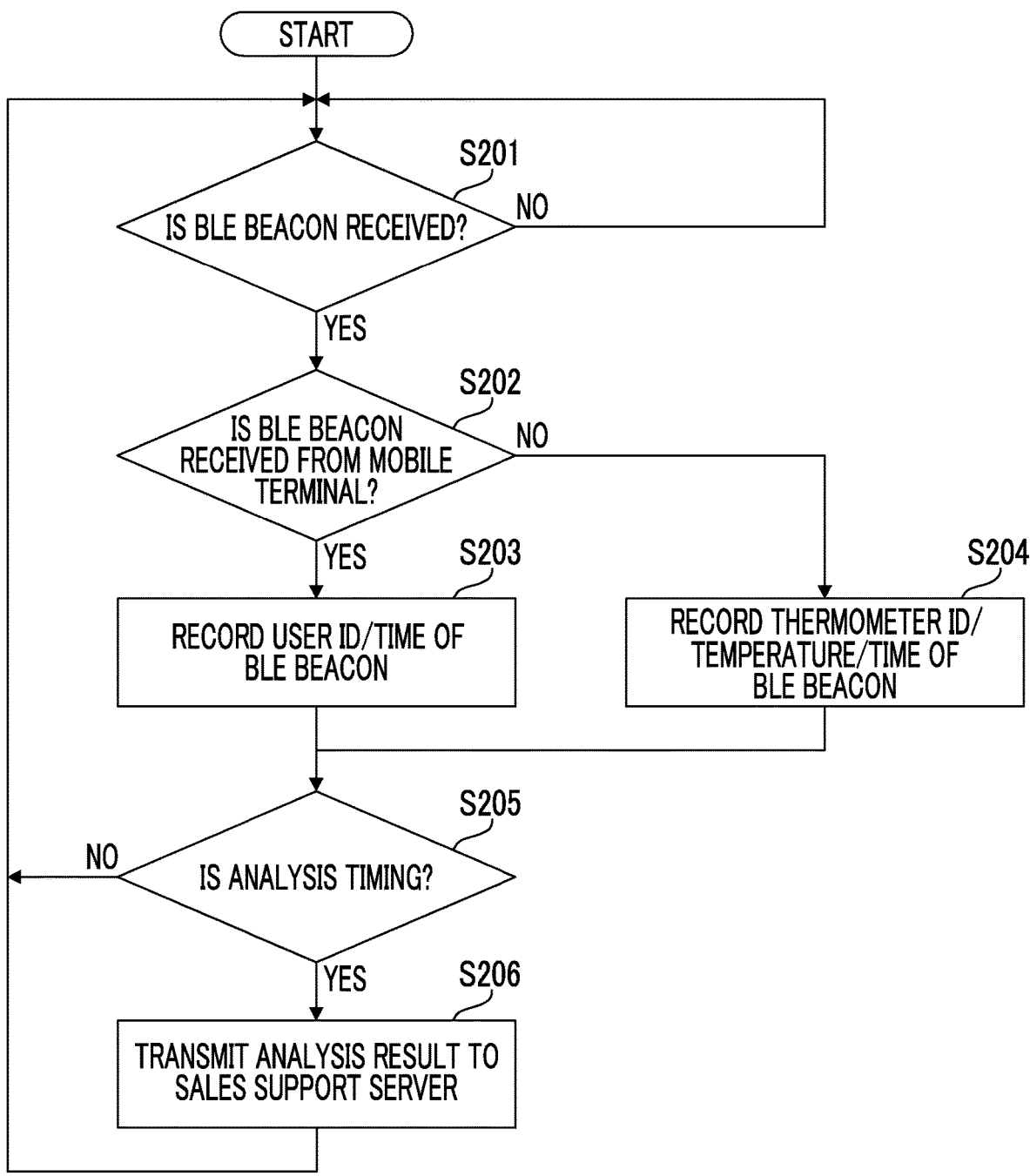
FIG. 19 is a flowchart for explaining a procedure of an IoT information analysis operation according to Exemplary Embodiment 1.
Figures 20A, 20B:
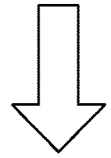
FIGS. 20A and 20B are diagrams illustrating an example of a primary analysis result using a history of communication with a mobile terminal carried by a user as IoT information according to Exemplary Embodiment 1.
Figures 21A, 21B:
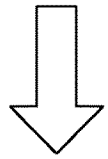
FIGS. 21A and 21B are diagrams illustrating an example of a primary analysis result using a history of communication with a thermometer as IoT information according to Exemplary Embodiment 1.

FIG. 19 is a flowchart for explaining a procedure of an IoT information analysis operation according to Exemplary Embodiment 1. FIGS. 20A and 20B are diagrams illustrating an example of a primary analysis result using a history of communication with a mobile terminal (for example, a smartphone, a smart watch, a tablet, a wearable device, or the like) carried by a user as IoT information according to Exemplary Embodiment 1. FIG. 20A illustrates an example of a history of IoT communication, and FIG. 20B illustrates an example of an analysis result. FIGS. 21A and 21B are diagrams illustrating an example of a primary analysis result using a history of communication with a thermometer as IoT information according to Exemplary Embodiment 1. FIG. 21A illustrates an example of a history of IoT communication, and FIG. 21B illustrates an example of an analysis result.

This will be explained with reference to FIG. 19.

First, the business analysis plug-in 213 (see FIG. 5) determines whether or not a BLE beacon is received (step 201). While a negative result is obtained, the business analysis plug-in 213 repeats the determination of step 201.

In a case where a positive result is obtained in step 201, the business analysis plug-in 213 determines whether or not the BLE beacon is received from the mobile terminal (step 202).

In a case where a positive result is obtained in step 202, the business analysis plug-in 213 records the user ID (User ID) and the time attached to the BLE beacon (step 203).

On the other hand, in a case where a negative result is obtained in step 202, the business analysis plug-in 213 records the thermometer ID, temperature (air temperature) and time attached to the BLE beacon (step 204).

Thereafter, the business analysis plug-in 213 determines whether or not the current time is the analysis timing (step 205).

In a case where a negative result is obtained in step 205, the business analysis plug-in 213 returns to step 201 and repeats the previous processing.

In a case where a positive result is obtained in step 205, the business analysis plug-in 213 executes analysis processing and transmits the result to the sales support server 40 (step 206). Thereafter, the business analysis plug-in 213 returns to step 201 and repeats the previous processing.

The examples of FIGS. 20A and 20B show examples of analyzing the actual state of work on a certain day, based on the reception history of the BLE beacon. In FIG. 20A, the first reception time and the last reception time of the BLE beacon are recorded for each user. This record is obtained by the business analysis plug-in 213 processing the reception history of the BLE beacon recorded for each person.

In the business analysis plug-in 213, as a macro analysis rather than an analysis of a real situation of work of an individual person, the number of people corresponding to early morning work and the total time, the number of people corresponding to late night work and the total time, and the number of people corresponding to holiday work and the total time are collected as the analysis result.

In the examples of FIGS. 21A and 21B, based on a temporal change in temperature (air temperature) measured at predetermined times by a thermometer provided in a room, the number of days and the length of time when the temperature exceeds an upper limit (for example, 26° C.) or a lower limit (for example, 16° C.) of a predetermined comfort temperature are collected as analysis results.

Return to FIG. 15.

Step 10

The business analysis plug-in 213 notifies the sales support server 40 of the analysis results described above as a primary analysis result, at predetermined timing (for example, every midnight, every week, or the like).

In a case where personal information is included in the analysis result, the business analysis plug-in 213 executes a concealment process.

Step 11

In a case of receiving the notification of the analysis result, the sales support server 40 selects the function providing plug-in 214 (see FIG. 5) and the product (service) to be recommended, in order to improve business problems. In the case of the present exemplary embodiment, the sales support server 40 selects the function providing plug-in 214 and the product (service) to be recommended, according to the business type and the business scale of the customer associated with the apparatus ID.

The sales support server 40 executes the selection process using the determination logic (FIGS. 22 to 24) prepared in advance.

FIG. 22 is a diagram illustrating an example of determination logic prepared for a customer having a large business scale.

In the determination logic shown in FIG. 22, the recommending function providing plug-in, the recommended product (service), and the recommendation condition are associated with the combination of the job type and the document type.

For example, in a case where there are more than 50 invoices for mobile jobs, a relationship is recorded in which "e-document storage service link plug-in" is recommended as the recommending function providing plug-in and "e document storage service" is recommended as the recommended product.

In a case where there are few mobile usages (mobile jobs), products using servers of on-premise type (so-called in-house type) are recommended rather than cloud services.

Therefore, in the case where the analysis result shown in FIG. 18 belongs to a customer with a large business scale, for example, a document sharing service and a document sharing service link plug-in, a paperless fax service and a paperless fax service link plug-in, and e-document storage server SW (on-premise) and an e-document storage server link plug-in are recommended.

FIG. 23 is a diagram illustrating an example of determination logic prepared for a customer having a small business scale.

Basically, the determination logic shown in FIG. 23 adopts a determination logic similar to that for a customer with a large business scale. Although the names of the services are similar, the actual contents are adjusted to contents according to the business scales. In addition, for customers with a small business scale, on-premise products that require server installation are not recommended, regardless of the amount of mobile usage (mobile jobs).

FIG. 24 is a diagram illustrating an example of determination logic for IoT information. In the determination logic shown in FIG. 24, the recommending function providing plug-in, the recommended product, and the recommendation condition are associated, for each type of information of attendance time and temperature (air temperature). In the case of the present exemplary embodiment, the customer's business scale is not distinguished.

Return to FIG. 15.

Step 12

The sales support server 40 lists a set of one or plural function providing plug-ins 214 selected in step 11 and a recommended product (service) as recommended product (services), based on the above-described determination logic. In the present exemplary embodiment, recommending function providing plug-ins correspond one-to-one to recommended products (services) to be sold, so only recommended products (services) are listed.

Step 13

In FIG. 15, the image processing apparatus 12 checks the version upgrade (Vup) of the business analysis plug-in 213 (see FIG. 5) irregularly. By upgrading the business analysis plug-in 213, the accuracy of the primary analysis can be improved. Further, it can be adapted to the latest product (service) that can provide primary analysis.

In the example of FIG. 15, the version upgrade is checked by the image processing apparatus 12, but at a time when a new version of business analysis plug-in 213 is registered, the plug-in distribution server 30 may perform push distribution of the business analysis plug-in 213 to the image processing apparatus 12.

Step 14

The salesperson accesses the sales support server 40 through the salesperson terminal 50 and checks the content of recommended products (services) listed for each customer.

Step 15

In the present exemplary embodiment, a salesperson selects apart from the recommended products (services) listed and gives an instruction to generate a proposal for the selected product (service).

Step 16

The sales support server 40 generates a proposal that summarizes the results of analyzing the customer's business and the effect expected in a case of introducing the proposed products through execution of a program which is prepared in advance.

Step 17

The sales support server 40 transmits the generated proposal to the salesperson terminal 50.

Step 18

A salesperson who obtains the generated proposal visits a customer and proposes the introduction of a product (service) that improves a business problem.

Step 19

In a case where the introduction of a new product (service) is decided as a result of negotiation, the salesperson inputs the product (service) to be added, to the sales support server 40, using the salesperson terminal 50.

Step 20

In a case where there is a function providing plug-in 214 (see FIG. 5) corresponding to the added product (service), the sales support server 40 registers a distribution request of the corresponding function providing plug-in 214 in the plug-in distribution server 30. This registration is associated with the apparatus ID.

Step 21

In accordance with the registration information, the plug-in distribution server 30 distributes the function providing plug-in 214 to the corresponding image processing apparatus 12.

In the present exemplary embodiment, a business analysis plug-in selected according to the type and scale of the customer's business installing the image processing apparatus 12 (see FIG. 1) (plug-in of which the content to be analyzed is set according to the type and scale of the business) is installed in the image processing apparatus 12 of the customer, thereby realizing efficient collection and analysis of data (job log, image log, and IoT information).

In other words, since it is not necessary to collect data that is irrelevant for the business type and businesses of a customer, computational resources necessary for the primary analysis are reduced. In addition, since data related to business problems is selectively collected, the accuracy of the primary analysis is improved.

The business analysis plug-in 213 (see FIG. 5) in the present exemplary embodiment realizes the analysis of the business including the contents of the paper document, by OCR processing the image log and classifying the contents of the document.

The business analysis plug-in 213 (see FIG. 5) in the present exemplary embodiment also realizes the analysis on the environment inside the office and the behavior of people, by using the IoT information collected through communication with the IoT device for analysis.

Further, in the present exemplary embodiment, a function of specifying business problems according to the combination of the type of job log and the type of image log (classification of content by OCR processing) and contributing to improvement of the specified problems is added to the image processing apparatus 12, as a function providing plug-in 214 (see FIG. 5), thereby increasing the improvement effect of business problems.

Further, in the present exemplary embodiment, since the version of the business analysis plug-in 213 is updated according to a change or update of products handled by sales (for example, step 13 in FIG. 15), continual provision of products (services) with a high improvement effect on business problems is realized. Therefore, it is expected that customer satisfaction and success rate of proposals by salespersons will be improved.

In the present exemplary embodiment, the image processing apparatus 12 analyzes the content obtained through primary analysis, according to the type and scale of the customer's business, so the proposal of the product (service) suitable for the circumstances of the customer is realized.

In the present exemplary embodiment, there is no manual intervention in the collection of job logs, image logs, and IoT information, occurring in the business activities of the customer, analysis of problems, and recommendation of products (services) for improving problems. That is, since the process up to the recommendation of the products (services) is executed based on the data (fact) generated in the business activities of each customer, the business efficiency of the salesperson is improved. On the customer side, the proposed product (service) is selected based on the data (fact) occurring in his business activities, so a risk of not improving an efficiency of business even if the product (service) is introduced is reduced.

In the case of the present exemplary embodiment, the analysis (a process of aggregating the results of use) of business by the business analysis plug-in 213 is executed at the timing at which the performance of the function provided by the image processing apparatus 12 to the user does not deteriorate, so there is no or few disadvantage to the customer side.

Example of Another System Sequence

An example of another system sequence will be described below.

FIG. 25 is a diagram illustrating an example of another system sequence. In FIG. 25, parts corresponding to those in FIG. 15 are denoted by the corresponding reference numerals.

The system sequence shown in FIG. 25 is different from that in Exemplary Embodiment 1 in that the customer designates the function providing plug-in 214 (see FIG. 5) to be installed in the image processing apparatus 12.

Among the system sequences shown in FIG. 25, steps 1 to 12 are common to FIG. 15.

In the system sequence shown in FIG. 25, the image processing apparatus 12 accesses the sales support server 40 and checks the contents of the recommended products (services) listed for the customer or the image processing apparatus 12 (step 31).

In this case, the customer himself selects a product (service) desired to install from the listed recommended products (services), from the user interface 130 of the image processing apparatus 12, and gives an instruction to the sales support server 40 (step 32).

The subsequent process is the same as in FIG. 15. That is, the sales support server 40 registers the distribution request of the function providing plug-in 214 selected for the plug-in distribution server 30. Further, in accordance with the registration information, the plug-in distribution server 30 distributes the function providing plug-in 214 to the corresponding image processing apparatus 12.

In this system sequence, the customer selects a product (service) required by the customer himself, the period of time until the business problem is improved is shortened. In addition, sales resources of salespersons are also effectively utilized.

Figure 26:
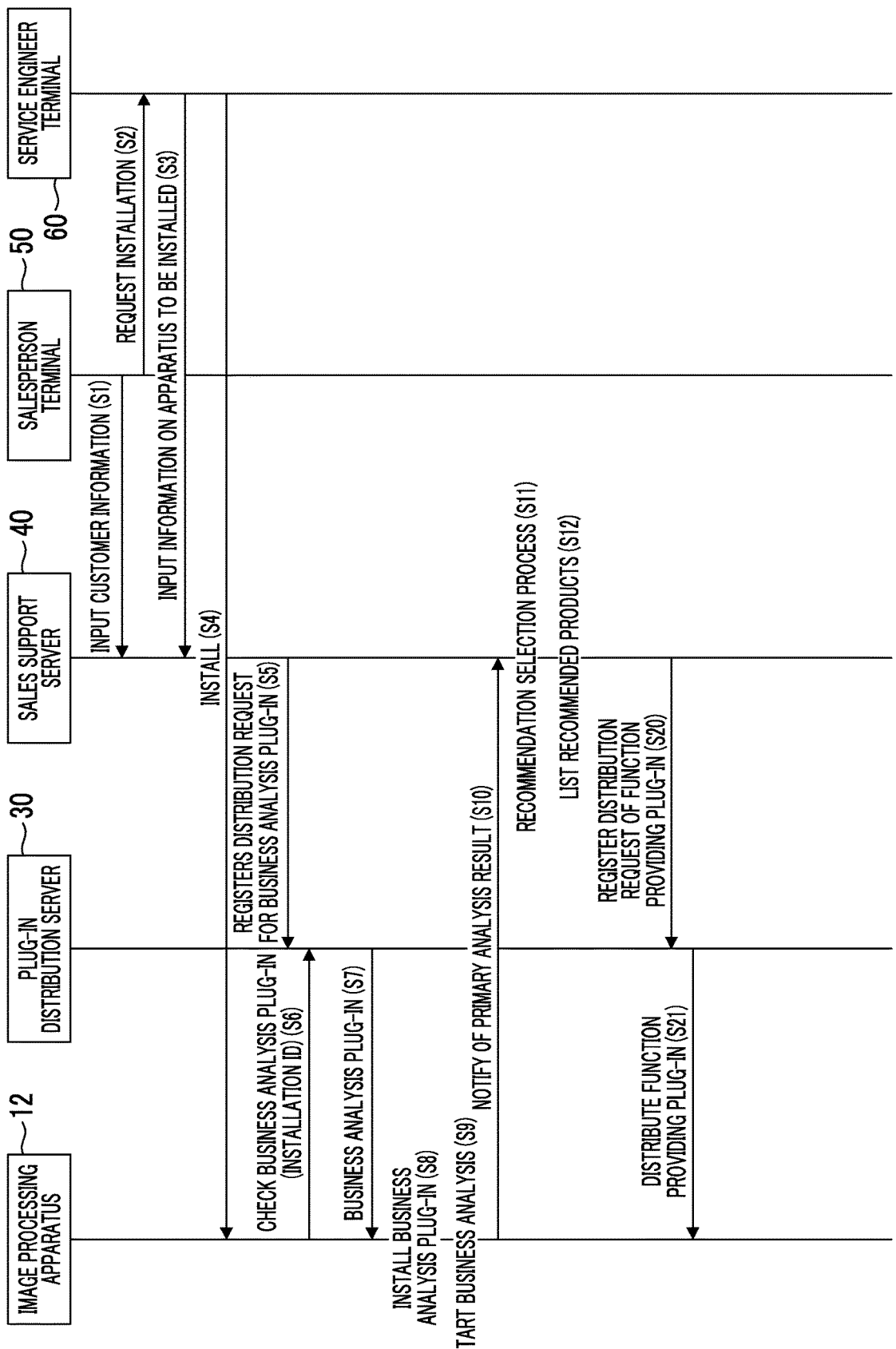
FIG. 26 is a diagram illustrating an example of another system sequence.

FIG. 26 is a diagram illustrating an example of another system sequence. In FIG. 26, parts corresponding to those in FIG. 15 are denoted by the corresponding reference numerals.

In the system sequence shown in FIG. 26, the sales support server 40 distributes the function providing plug-in 214 (see FIG. 5) corresponding to the recommended product (service) to the image processing apparatus 12, without receiving a selection or an instruction from a person. This system sequence is used, for example, in a full support contract.

It should be noted that the system sequence shown in FIG. 26 may be used only for predetermined functions of a specific type.

FIG. 27 is a diagram illustrating an example of another system sequence. In FIG. 27, parts corresponding to those in FIG. 15 are denoted by the corresponding reference numerals.

The system sequence shown in FIG. 27 is a case where the primary analysis is not executed by the image processing apparatus 12.

In this case, the image processing apparatus 12 after installation starts collecting job logs and the like (step 41). Unlike the above-described embodiment, there is no restriction on the types of job logs and IoT information collected in the system sequence. The collected job logs and the like are notified to the sales support server 40 at a predetermined timing (step 42). In this case, it is desirable to execute a process of concealing the personal information included in the job log or the like.

In this example, the sales support server 40 executes business analysis by using a business analysis program prepared according to the type and scale of the customer's business (step 43). The following operations are the same as those in Exemplary Embodiment 1 except step 13.

In the system sequence, since the functions of business analysis are integrated in the sales support server 40, the business analysis using the latest business analysis program is always realized.

FIG. 28 is a diagram illustrating an example of another system sequence. In FIG. 28, parts corresponding to those in FIG. 15 are denoted by the corresponding reference numerals.

The system sequence shown in FIG. 28 is a case where the image processing apparatus 12 also executes processes such as selection of recommended products (services). In other words, it is an example where the secondary analysis processing that has been executed by the sales support server 40 is also executed by the image processing apparatus 12, and only the distribution function of the function providing plug-in 214 (see FIG. 5) useful for improving business problems is prepared on the system side.

In the case of this example, the business analysis plug-in 213 (see FIG. 5) also includes the recommending function which has been executed by the sales support server 40. In a case of this example, the business analysis plug-in 213 requests the plug-in distribution server 30 to supply the function providing plug-in 214 (see FIG. 5) corresponding to the recommended product (service). Here, the function of requesting the function providing plug-in 214 is an example of the requesting unit.

In the case of this system sequence, although the calculation resources of the image processing apparatus 12 are consumed to a large extent, it is not necessary to externally output information on business activities. Therefore, it is recommended for customers who do not want to provide information including information that is estimated for business activities, to the outside.

By combining the version upgrade (step 13 in FIG. 15) of the business analysis plug-in 213, the consumption (service) to be recommended is maintained at the latest state. Of course, the accuracy of analysis is also kept high.

Other Exemplary Embodiments

Although the exemplary embodiment has been described above, the technical scope of the present invention is not limited to the scope described in the above exemplary embodiment. For example, it is obvious from the description of the scope of the claims that various modifications or improvements to the above-described exemplary embodiment are also included in the technical scope of the present invention.

For example, in the above-described exemplary embodiment, a process of aggregating job logs and image logs by type is executed in a period during which the image processing apparatus 12 (see FIG. 1) is not in use, but a classification process as a preprocess may also be executed in the period during which the image processing apparatus 12 is not in use. In other words, the business analysis plug-in may be executed in the period during which the image processing apparatus 12 is not in use.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a first processor configured to:
   collect at least any two selected from a job log, an image log of a document, and information to be monitored through communication with a terminal present around the information processing apparatus;
   classify at least two of the job log, the image log, and the information to be monitored that have been collected by type; and
   aggregate results of use for combinations in which at least two types of the job log, the image log, and the information to be monitored that have been classified are combined.

2. The information processing apparatus according to claim 1,
   wherein the first processor is configured to acquire a first plug-in prepared according to the result of use from the server apparatus side, the first plug-in providing a function of supporting a business activity.

3. The information processing apparatus according to claim 2,
   wherein the first plug-in acquired by the first processor is specified through a selection operation by a user of the information processing apparatus.

4. The information processing apparatus according to claim 2,
   wherein it is possible to use a specific service that supports business activities by executing the first plug-in.

5. The information processing apparatus according to claim 1,
   wherein the first processor for classifying and aggregating is realized by execution of a second plug-in which is selectively added according to the type and scale of a user's business.

6. The information processing apparatus according to claim 1,
   wherein the first processor for aggregating is not executed, in a case where an operation by a user is detected, a job is executed, or a job is present.

7. The information processing apparatus according to claim 1,
   wherein the first processor for aggregating is executed only within a preset period or in a period during which the job is not executed.

8. The information processing apparatus according to claim 1,
   wherein the first processor classifies the type of each document based on a text extracted from the image log.

9. The information processing apparatus according to claim 8,
   wherein the first processor collects both or one of information on indoor environment and information on a person's behavior in a room as the information to be monitored.

10. A server apparatus comprising:
    a first processor configured to acquire results of use for each combination of at least two types selected from a type of a job log, a type of an image log, and a type of information to be monitored in an information processing apparatus to be managed; and
    a second processor, coupled to the first processor, configured to distribute a first plug-in that provides a function to support business activities specified according to the result of use, to the corresponding information processing apparatus.

11. The server apparatus according to claim 10,
wherein a first plug-in candidate is presented before distributing the first plug-in to the corresponding information processing apparatus.

12. The server apparatus according to claim 11,
wherein the first plug-in candidate is presented to a worker on the server apparatus side.

13. The server apparatus according to claim 10,
wherein the first plug-in corresponds to the combination in which the result of use of the first plug-in exceeds a predetermined threshold value.

14. The server apparatus according to claim 10,
wherein the first plug-in corresponds to information that exceeds a predetermined threshold value, among values aggregated for both or one of information on the environment in the room where the information processing apparatus is used and information on a person's behavior in a room.

15. The server apparatus according to claim 10,
wherein it is possible to use a specific service that supports business activities by executing the first plug-in.

16. The server apparatus according to claim 10,
wherein the second processor distributes a second plug-in to the corresponding information processing apparatus, the second plug-in being prepared in advance according to a combination of the type and the scale of business of a user registered for the information processing apparatus, and provides a function of aggregating the results of use.

17. The server apparatus according to claim 10,
wherein the results of use are aggregated in the server apparatus, according to a combination of the type and the scale of business of a user registered for the information processing apparatus.

18. A business system comprising:

an information processing apparatus including a first processor configured to collect at least any two selected from a job log, an image log of a document, and information to be monitored through communication with a terminal present around the information processing apparatus, classify at least two of the job log, the image log, and the information to be monitored that have been collected by type, and aggregate results of use for combinations in which at least two types of the job log, the image log, and the information to be monitored that have been classified are combined; and a server apparatus including a second processor configured to acquire results of use for the information processing apparatus to be managed, and a third processor configured to distribute a first plug-in which provides a function of supporting business activities specified according to the result of the use to a corresponding information processing apparatus.

19. The business system according to claim 18,
wherein in a case where a combination in which the result of use exceeds a predetermined threshold value, the server apparatus provides the third processor with the first plug-in prepared in advance for the combination.

* * * * *